US011181756B1

(12) United States Patent
Sanchez et al.

(10) Patent No.: US 11,181,756 B1
(45) Date of Patent: *Nov. 23, 2021

(54) EYEWEAR AND SYSTEMS FOR IMPROVEMENT OF WEARER COMFORT

(71) Applicant: Costa Del Mar, Inc., Daytona Beach, FL (US)

(72) Inventors: John Sanchez, Palm Coast, FL (US); Casey Lopez, Palm Coast, FL (US); Marc Tappeiner, Santa Barbara, CA (US)

(73) Assignee: COSTA DEL MAR, INC., Daytona Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,726

(22) Filed: Nov. 5, 2019

Related U.S. Application Data

(63) Continuation-in-part of application No. 15/874,557, filed on Jan. 18, 2018, now Pat. No. 10,558,059.

(60) Provisional application No. 62/617,442, filed on Jan. 15, 2018, provisional application No. 62/860,005, filed on Jun. 11, 2019.

(51) Int. Cl.
  *G02C 11/08* (2006.01)
  *G02C 5/14* (2006.01)

(52) U.S. Cl.
  CPC .............. *G02C 11/08* (2013.01); *G02C 5/146* (2013.01)

(58) Field of Classification Search
  CPC .......... G02C 11/08; G02C 11/12; G02C 5/146
  USPC ...................................... 351/62, 113; 2/435
  See application file for complete search history.

(56) References Cited

U.S. PATENT DOCUMENTS

| 627,564 | A | 6/1899 | Yankee |
|---|---|---|---|
| 2,269,037 | A | 1/1942 | Oker |
| 2,403,223 | A | 7/1946 | Kaesz |
| 2,482,195 | A | 9/1949 | Martin |
| 2,749,800 | A | 6/1956 | Gagnon |
| 2,781,693 | A | 2/1957 | Brumby |
| 3,052,160 | A | 9/1962 | Ratti |
| 3,395,406 | A | 8/1968 | Smith |
| 3,724,934 | A | 4/1973 | Bloom |
| 4,222,640 | A | 9/1980 | Bononi |

(Continued)

OTHER PUBLICATIONS

Victoria Beckam Gold Grooved Aviator Glasses, https://www.ssense.com/en-us/women/product/victoria-beckham/gold-grooved--aviator-glasses/2466238, Nov. 30, 2017.

(Continued)

*Primary Examiner* — Hung X Dang
(74) *Attorney, Agent, or Firm* — Malloy & Malloy, P.L.

(57) ABSTRACT

An eyewear frame includes a plurality of ventilation apertures disposed in fluid communication with corresponding ones of a plurality of fluid channels. The plurality of ventilation apertures are dimensioned and configured to conduct fluid from an outer face of the ventilated eyewear frame to an inner face. The plurality of ventilation apertures are further dimensioned and configured to conduct fluid from at least one inlet to at least two outlets, the fluid thus interacting with a plurality of fluid channels simultaneously. The plurality of fluid channels are dimensioned and configured to conduct fluid there along, and at least partially in communication with a wearer of the ventilated eyewear frame, facilitating heat exchange with the wearer, fluid drainage, and a reduction in fogging of the lenses of the eyewear.

27 Claims, 23 Drawing Sheets

(56) References Cited

U.S. PATENT DOCUMENTS

| | | | |
|---|---|---|---|
| 4,345,824 | A | 8/1982 | Daubignard |
| 4,470,674 | A | 9/1984 | Piampiano |
| 4,665,598 | A | 5/1987 | Murai et al. |
| 4,703,522 | A | 11/1987 | Schurle et al. |
| 5,042,934 | A | 8/1991 | Nakanishi |
| 5,270,743 | A | 12/1993 | Hofmair et al. |
| 5,343,259 | A | 8/1994 | Nakanishi |
| 5,355,185 | A | 10/1994 | Lee |
| 5,373,331 | A | 12/1994 | Vallalla et al. |
| 5,423,092 | A | 6/1995 | Kawai |
| 5,537,161 | A | 7/1996 | Monroe |
| 5,541,674 | A | 7/1996 | Jannard |
| 5,583,583 | A | 12/1996 | Wilson |
| 5,608,469 | A | 3/1997 | Bolle |
| 5,764,333 | A | 6/1998 | Somsel |
| 5,768,716 | A | 6/1998 | Porsche |
| 5,815,235 | A | 9/1998 | Runckel |
| 5,898,468 | A | 4/1999 | Mage |
| 5,903,331 | A | 5/1999 | Lin |
| 5,907,384 | A | 5/1999 | Kirsch et al. |
| 5,956,115 | A | 9/1999 | Bolle |
| 5,963,296 | A | 10/1999 | Matera |
| 6,019,467 | A * | 2/2000 | Kawamoto .............. G02C 5/10 16/228 |
| 6,056,399 | A | 5/2000 | Jannard et al. |
| 6,168,271 | B1 | 1/2001 | Houston et al. |
| 6,196,681 | B1 | 3/2001 | Canavan |
| 6,233,342 | B1 | 5/2001 | Fernandez |
| 6,253,388 | B1 | 7/2001 | Lando |
| 6,264,327 | B1 | 7/2001 | Copeland |
| 6,334,680 | B1 | 1/2002 | Larson |
| 6,561,647 | B1 | 5/2003 | Chen |
| 6,592,220 | B1 | 7/2003 | Cheong |
| 6,604,824 | B2 | 8/2003 | Larson |
| 6,637,877 | B1 | 10/2003 | Hartley et al. |
| 6,692,124 | B2 | 2/2004 | Kate et al. |
| 6,715,873 | B2 | 4/2004 | Nahmias |
| 6,729,725 | B1 | 5/2004 | Cheng |
| 6,767,095 | B1 | 7/2004 | Altelaar et al. |
| 6,783,235 | B1 | 8/2004 | Lin |
| 6,863,395 | B1 | 3/2005 | Teng |
| 6,890,073 | B2 | 5/2005 | DiChiara et al. |
| 7,036,927 | B2 | 5/2006 | Kopfer |
| 7,137,700 | B2 | 11/2006 | DiChiara et al. |
| 7,150,525 | B1 | 12/2006 | Yang |
| D552,663 | S | 10/2007 | Cheng |
| D555,703 | S | 11/2007 | Damen |
| 7,296,887 | B1 | 11/2007 | Hsiung |
| 7,481,529 | B1 | 1/2009 | Chen |
| 7,506,977 | B1 | 3/2009 | Aiiso |
| 7,648,233 | B2 | 1/2010 | Blanshay et al. |
| 7,712,894 | B2 | 5/2010 | Tsai |
| 7,856,673 | B2 | 12/2010 | Reed |
| 8,182,086 | B2 | 5/2012 | Cheong |
| D662,536 | S | 6/2012 | Shin |
| D748,720 | S | 2/2016 | Lee et al. |
| D763,944 | S | 8/2016 | Shin |
| D769,963 | S | 10/2016 | Shin |
| D775,266 | S | 12/2016 | Chen |
| D799,583 | S | 10/2017 | Earley |
| 10,558,059 | B1 | 2/2020 | Sanchez et al. |
| 2005/0007546 | A1 | 1/2005 | Pilat, Jr. et al. |
| 2005/0243271 | A1 | 11/2005 | Oura et al. |
| 2005/0280771 | A1 | 12/2005 | DiChiara et al. |
| 2006/0238698 | A1 | 10/2006 | Sheldon |
| 2006/0238700 | A1 | 10/2006 | Del Vecchio |
| 2006/0268218 | A1 | 11/2006 | Medana |
| 2007/0013863 | A1 | 1/2007 | Zelazowski |
| 2007/0261155 | A1 | 11/2007 | Tabacchi |
| 2010/0064422 | A1 | 3/2010 | Dichiara |
| 2010/0085533 | A1 | 4/2010 | Calilung et al. |
| 2014/0340628 | A1 | 11/2014 | Huang |

OTHER PUBLICATIONS

Costa Del Mar Bloke Sunglasses, https://www.amazon.com/gp/product/B01M4QFHTR/, Oct. 31, 2016.
Bonita, Gray Lens. Costa Del Mar, http://www.costadelmar.com/shop/sunglasses/bonita, Apr. 20, 2012.
Costa Del Mar, Costa 2013 Workbook. Costa Del Mar. 2012. pp. 14-19, Jan. 1, 2012.
Cheeca, Copper Lens. Costa Del Mar, http://www.costadelmar.com/shop/sunglasses/cheeca, Apr. 20, 2012.
Saint Laurent Combi Flat Top Sunglasses, https://shop.nordstrom.com/s/saint-laurent-combi-59mm-flat-top-sunglasses-/4796172, Dec. 1, 2017.
Oakley, Crossrange Patch (Asia Fit), http://www.oakley.com/en/mens/sunglasses/crossrange-patch-prizm-asia-fit-- /product/W0OO9391APZ/?skuCode=OO9391-0360&variant=888392296504 &categoryCod- e=m02, May 16, 2019.
Cruz Matte Gold, https://www.diffeyewear.com/products/cruz-matte-gold-frame-brown-gradient- - lensffeyewear.com, Nov. 30, 2017.
Fathom, GlassMirror Lens. Costa Del Mar, http://www.eyeglasses.com/product/1091472073-1091472073, Dec. 7, 2006.
Field & Stream Breakpoint Sunglasses, https://www.dickssportinggoods.com/p/field-stream-breakpoint-polarized-su- nglasses-16fnsmbrkpntblksmsgs/16fnsmbrkpntblksmsgs, Dec. 11, 2017.
G&G Polarized Square Aviator, https://www.amazon.com/Polarized-Square-Aviator-Sunalasses/dp/B00LPQVIMC, Jul. 11, 2014.
Givenchy Flat Top Sunglasses, https://www.shopbop.com/flat-top-sunglasses-givenchy/vp/v=1/15308030- 09.htm, Dec. 1, 2017.
Guess Mens GU6835 Sunglasses, https://www.amazon.com/Guess-Mens-GU6835-Rectangular-Sunalasses/dp/B- 01EI1UYIE., Apr. 19, 2016.
Oakley, http://www.oakley.com/en/mens/sunglasses/jawbreaker-prizm-trail/product/W-0OO9290PZTL/?skuCode=OO9290-2531 &variant=888392262035&CategoryCode=m02, May 16, 2019.
Jose, Blue Mirror Lens. Costa Del Mar, http://www.costadelmar.com/shop/sunglasses/iose, Apr. 20, 2012.
Lionel Eyeglasses, https://www.warbyparker.com/eyeglasses/men/lionel/jet-silver, Nov. 30, 2017.
Maui Jim Stingray, https://www.amazon.com/Maui-Jim-Sunglasses-Stingray-Polarized/dp/B002FU6T- 8U/, Mar. 12, 2003.
Native Product Catalog Two Thousand Thirteen, Native Product Catalog Two Thousand Thirteen. Costa Del Mar. pp. 6-7, Jan. 1, 2012.
Nike, Nike Hyperforce Elite, https://www.nikevision.com/us/en/products/detail/nike-hyperforce-elite/#E-V1026_070, May 16, 2019.
Piper Sunglasses, https://www.costadelmar.com/us/en/men/sunglasses/view-all/piper/PIP.html, Nov. 30, 2017.
Costa Del Mar Polarized Sunglasses, https://www.dickssportinggoods.com/p/costa-del-mar-mens-fantail-sunglasse- s-16demfntlsrdblmrsgs/16cdemfntlsrdblmrsgs, Dec. 4, 2017.
Premium Asian Fit Sports Square Aviator Sunglasses, https://www.shopzerouv.com/collections/avaitor-sunglasses/products/premiu- m-asian-fit-sports-metal-frame-sguare-aviator-sunglasses-8529, Dec. 2, 2017.
Oakley, Radar EV Pitch, http://www.oakley.com/en/mens/sunglasses/radar-ev-pitch-product/W0OO9211-03&variant=888392105264 &categoryCode=m02, May 16, 2019.
Costa Del Mar Reefton Sunglasses, https://www.dickssportinggoods.com/p/costa-del-mar-reefton-580p-polarized-- sunglasses-17cdeurftnmtttrtgsgs/17cdeurftnmtttrtgsgs, Dec. 11, 2017.
Serengeti Pareto Sunglasses, https://www.amazon.com/Serengeti-Pareto-Sunglasses-Polar-Drivers/dp/B007O- XZ3TE/, Dec. 2, 2017.
Saint Laurent SL1 Flat Top Sunglasses, https://shop.nordstrom.com/s/saint-laurent-sl1-59mm-flat-top-sunglasses/4- 247673, Dec. 1, 2017.
Suncloud Conductor Polarized Sunglasses, https://www.amazon.com/Suncloud-S-CDPPBRTT-P-Conductor-Polarized-Sunglass- es/dp/B00BY39VW, Dec. 4, 2017.
Super Dark Black Lens Sunglasses, https://www.amazon.com/SUPER-Black-Sunglasses-Square-Oversized/dp/B0- 0EVYYLNI, Dec. 1, 2017.
Thom Browne Gold Aviator Glasses, https://ssense.com/en-us/women/product/thom-browne/gold-aviator-glas- ses/2041893, Nov. 30, 2017.

(56) References Cited

OTHER PUBLICATIONS

Toms Unisex Navigator, https://www.amazon.com/Toms-Unisex-Navigator/dp/B01F2OGJB2, Apr. 9, 2015.

* cited by examiner

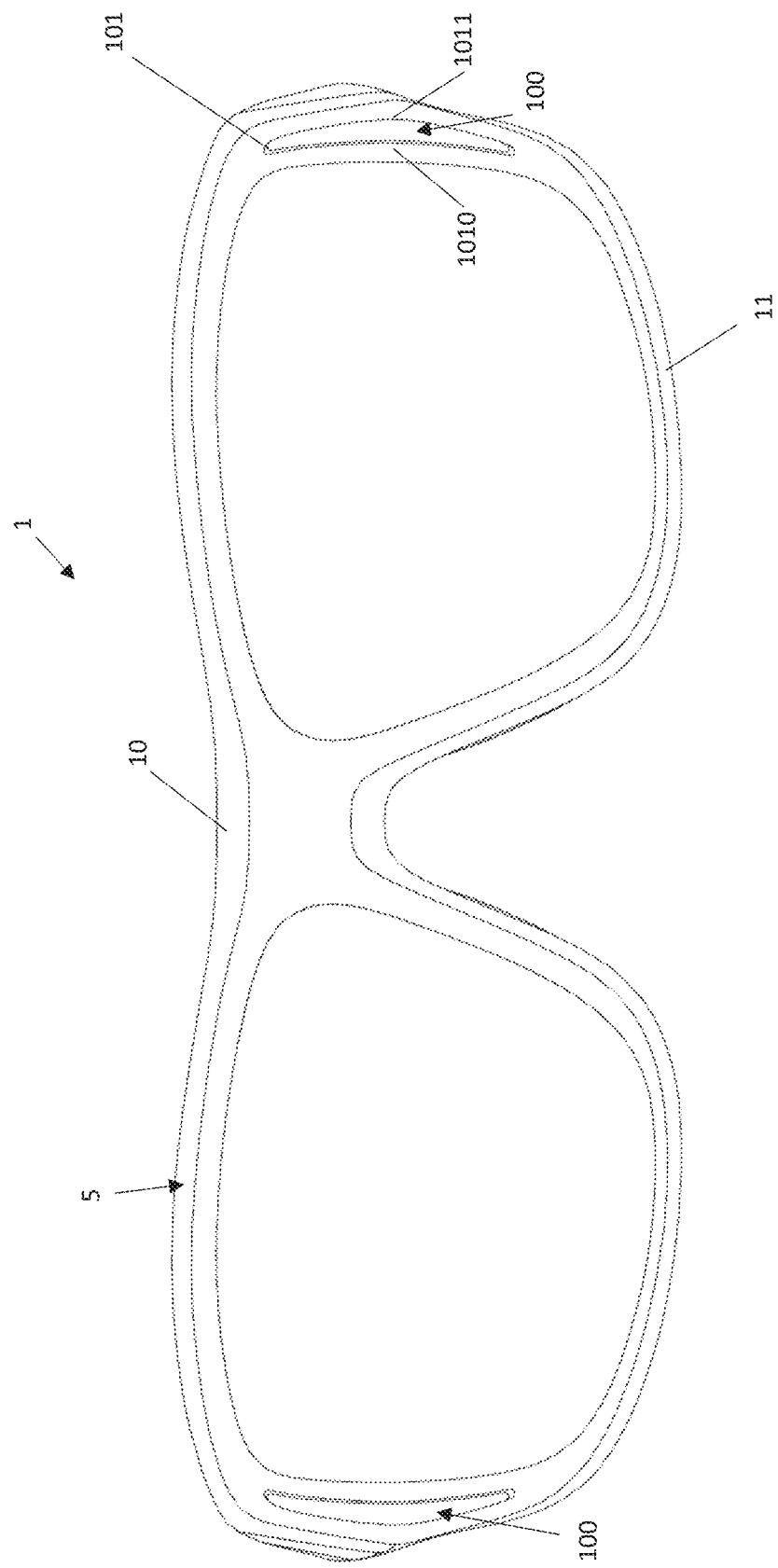

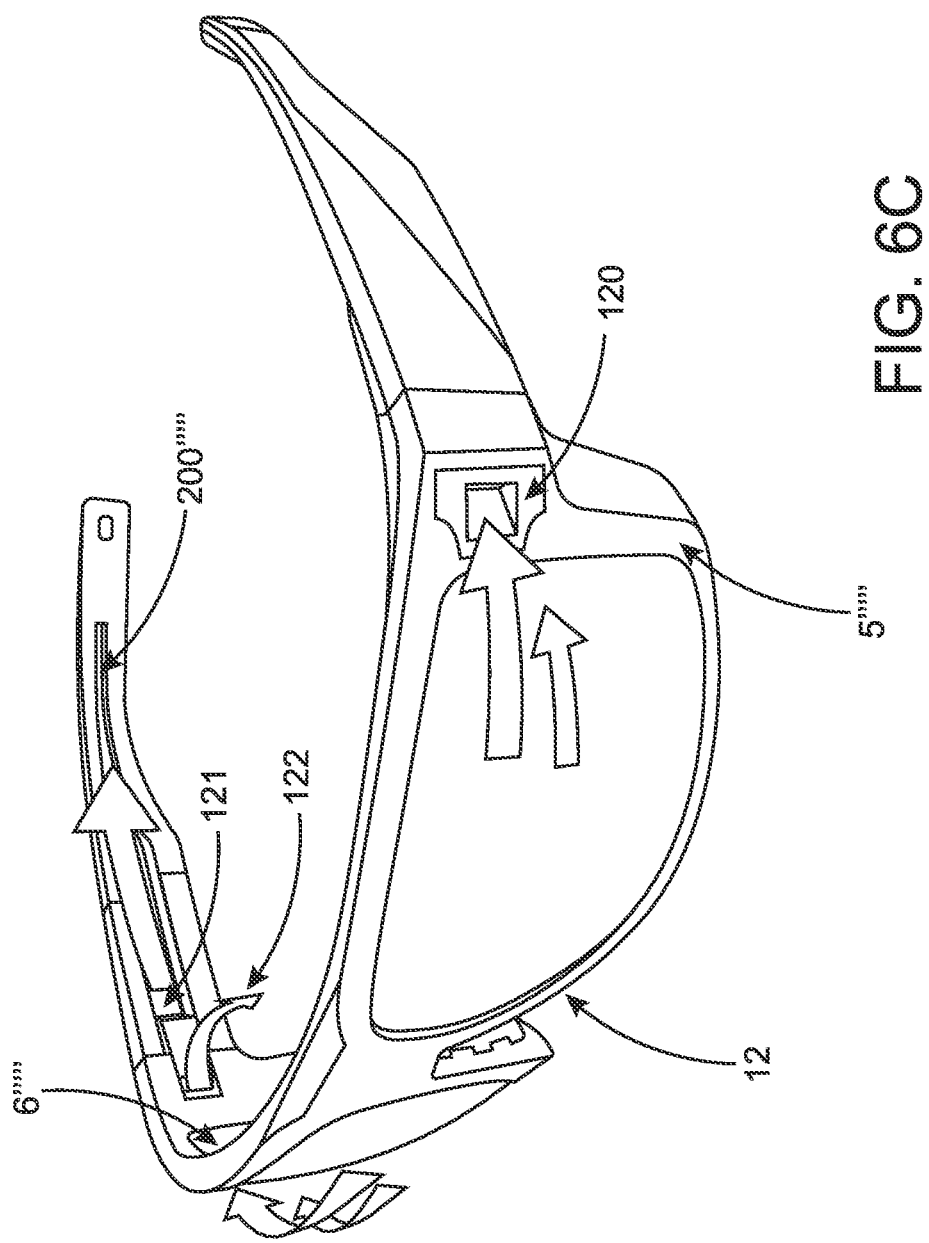

EYEWEAR AND SYSTEMS FOR IMPROVEMENT OF WEARER COMFORT

CLAIM OF PRIORITY

The present application is a continuation-in-part application of a previously filed, application having Ser. No. 15/874,557, filed on Jan. 18, 2018, now U.S. Pat. No. 10,558,059, which claims priority to a provisional application having Ser. No. 62/617,442, filed on Jan. 15, 2018, in addition to claiming priority to a provisional application having Ser. No. 62/860,005, filed on Jun. 11, 2019, from which all of the content is incorporated herein by reference in their entireties.

BACKGROUND OF THE INVENTION

Field of the Invention

The invention is directed to eyewear incorporating various features and elements for management of light, heat, and moisture thereby improving wearer comfort.

Description of the Related Art

In designing eyewear for active or sporting purposes, there may be a variety of criteria to satisfy the functional objectives of the design. In bright, hot environments, such as may be common to sport fishing, the management of light, heat, and moisture are important to the comfort of the wearer, yet accomplishing these objectives can sometimes run contrary to one another.

By way of example, in order to effectively manage the amount of light reaching a wearer's eyes or cornea, it is desirable not only to utilize quality lenses, but to position those lenses properly relative to the wearer, and construct the frame to block peripheral light that may enter around the lenses. In this regard, the eyewear frame may be constructed to substantially conform to a wearer's face, in order to reduce the incidence of light leakage about the periphery of the frame. Moreover, a temple bar of the eyewear may be constructed of sufficient dimension to block light that would otherwise reach the wearer's cornea.

Yet these features that tend to block peripheral light also restrict fluid flow behind and/or underneath the eyewear. For instance, air flow may be restricted due to the close conformity of the frame and temple bars to a wearer's head and face, significantly reducing convective heat transfer in those regions that is necessary to evaporate perspiration and cool the wearer. Such an arrangement can lead to condensation build up on the interior of the lenses. Additionally, perspiration may become trapped under the frame or temple bars and, because air flow is limited, any such perspiration will not evaporate efficiently. Similarly, depending upon the configuration of the eye wire and the shape of the wearer's cheek, perspiration may collect at the bottom of the frames if trapped between the lower portion of the eye wire and the wearer's cheek.

Some of these concerns with heat and perspiration management have been addressed in the industry by minimizing the size of the frame and temple arms, and/or enlarging the lenses to wrap substantially past the wearer's peripheral vision. However, as some light still reaches the wearer through the lens from the periphery, this design does not manage light as efficiently as a design with larger frame portions designed to block peripheral light. Attempts to place ventilation holes through the frame and/or temple bars lead to peripheral light leakage as well.

Other attempts to address these concerns have eliminated the eye wire completely from the bottom of the frame, and merely secure the lenses to the frame at the top portion of the lenses. While such a configuration may lend itself to increased air flow, it still does not manage light effectively and also suffers from decreased impact resistance. A complete eye wire, which fully surrounds the lens, is desired for maximum impact resistance.

As such, there is a need in the art for eyewear that fosters fluid flow behind and underneath the frames, without sacrificing light management capabilities, and may provide other features and advantages.

SUMMARY OF THE INVENTION

The present invention is directed to eyewear incorporating various features and element which increase wearer comfort, generally with respect to heat and moisture management, without significant sacrifice to the eyewear frame's light management capability. Moreover, the features and elements disclosed herein may be incorporated into a variety of eyewear styles using known construction methods, such that the invention may be incorporated into existing eyewear frames without significant cost or complexity. Additionally, the present invention may be deployed on a variety of different eyewear frames, including but certainly not limited to sunglass frames, ophthalmic frames, safety glass frames, goggles, and the like.

Accordingly, one objective of the present invention is to facilitate fluid flow behind and underneath the front element and temple bar of the eyewear frame. In one embodiment, one or more ventilation apertures are disposed within the eyewear frame and are configured and dimensioned to direct airflow from the outer face of the eyewear frame to at least the inner face of the eyewear frame. In at least one embodiment, the ventilation apertures include an inlet disposed on an outer face of either the front element or temple bar, and an outlet disposed on an inner face of either the front element or temple bar.

In a preferred embodiment, the inlet and outlet are configured and dimensioned to obscure peripheral light travelling in the direction of a wearer's cornea. As such, the ventilation aperture may be oriented substantially perpendicular to the front surface of the eyewear frame, thereby occluding light from traveling inward toward a wearer's cornea. Additionally, or alternatively, the ventilation aperture may be positioned such that when a wearer places the eyewear frame on the wearer's face, the ventilation apertures are situated behind the wearer's cornea, even further reducing the incidence of light entering a wearer's cornea from the periphery. As may be appreciated, disposing the ventilation apertures on the eyewear frame proximally to the lenses allows for a substantially perpendicular orientation of the ventilation aperture through the eyewear frame, while disposing the ventilation aperture on the temple bars facilitates relative positioning of the ventilation aperture behind a wearer's cornea. The optimal placement of the ventilation aperture, with the foregoing considerations in mind, will vary depending upon the shape and dimension of the eyewear frame, but many variations can be accomplished without departing from the spirit and scope of the invention. Additionally, the precise geometry of the ventilation aperture, including but not limited to its shape and size, may be varied to accommodate other considerations, such as aesthetic qualities of the eyewear frame.

Yet another feature of the present invention is the introduction of a fluid channel within the temple bar. In at least one embodiment, a fluid channel is disposed within the inner face of the temple bar and runs substantially from the proximal end, where the temple bar adjoins the eyewear frame, to the distal end of the temple bar. As such, air flow conducted to the inner face of the eyewear frames by the ventilation apertures is now available to be further conducted along the fluid channel, in communication with the face and/or head of a wearer, thereby facilitating heat exchange and moisture evaporation from the wearer. It will be appreciated that the fluid channel need not be open and disposed in fluid communication with the wearer along its entire length, and instead, only a portion of it may be open, while the remainder is enclosed within the temple bar. Moreover, the fluid channel need not extend the entire length of the temple bar, and may terminate at an intermediate point.

In a preferred embodiment, the ventilation aperture and fluid channel are correspondingly dimensioned and configured to facilitate direct fluid communication from the ventilation aperture to the fluid channel. By way of example, the outlet of the ventilation aperture may be disposed to conduct air directly into the fluid channel. However, such direct fluid communication is not required to accomplish the principles and objectives of the present invention.

In another embodiment, the fluid channel is dimensioned and configured to facilitate fluid communication with a wearer's head and/or face and additionally, to conduct fluid from the wearer along the length of the fluid channel.

Even in the event that no fluid enters directly though the ventilation aperture and into the fluid channel, fluid moving about the outer face of the eyewear may still generate a pressure and/or velocity differential relative to the inner face of the eyewear which is sufficient to motivate fluid along the fluid channel and/or through the ventilation aperture.

In yet another embodiment, a drain aperture may be disposed through the temple bar at a distal end of the temple bar and further, in fluid communication with the fluid channel. To the extent that moisture trapped within the fluid channel is not evaporated, it may also be conducted along the channel and out the drain aperture. In further embodiments, the drain aperture may be dimensioned and configured to accept retention loops for lanyards, eyewear retention cords, and the like.

Yet another feature of the present invention includes an eye wire of substantially reduced thickness on the inner face in order to reduce the potential for moisture to "pool" or collect at the bottom of the eyewear frames and against a wearer's cheek. In a preferred embodiment, it is not necessary that the entire eye wire be of reduced thickness, rather, only the lower portions of the eye wire need substantially conform to the lens in order to provide a relief point for drainage of fluid. Accordingly, thicker portions of the eye wire, in areas not required for drainage, may contribute to rigidity of the frame and further secure the lens.

Yet another feature of the present invention is the incorporation of ridges into rubber or rubberized gripping points, such as the nose rubber and temple bar rubber. The ridges facilitate drainage of moisture and increase mechanical grip on the user's face when perspiring. As such, slippage is reduced, and thereby the wearer is alleviated from constant adjustment of the eyewear frames during, e.g., excessive perspiration. Moreover, because the mechanical grip of the eyewear on the wearer is increased, the spring pressure exerted by the eyewear frames on the wearer, e.g. at nose pads or along the mastoid bone, necessary to overcome gravity can be reduced, and therefore, the comfort of the wearer is increased.

In yet another embodiment, a diverter is disposed within the ventilation apertures so as to direct air flow from the inlet of the ventilation apertures into two or more separate outlets. In this embodiment, the diverter comprises a temple bar outlet which directs air flow conducted through the ventilation apertures along the fluid channel disposed in the temple bars. Concurrently, the diverter comprises an inner face outlet which directs air flow conducted through the ventilation apertures across the inner face and along the eye wire therein disposed. Accordingly, the diverter causes air flow to facilitate heat exchange, moisture evaporation, and fluid drainage from the wearer along the temple bar and across the eye wire at the same time.

In another embodiment, at least one duct is disposed within the diverter, directing airflow into an outlet disposed in fluid communication with the temple bar. In yet another embodiment, the diverter contains at least two ducts, which not only direct airflow into an outlet disposed in fluid communication with the temple bar, but further provide greater strength to withstand the forces and pressures associated with the diverter's location in the eyewear.

In a further embodiment, the diverter is instead disposed in a separable branching conduit which may be inserted into the ventilation apertures. In this embodiment, the diverter directs air flow from the inlet of the separable branching conduit into two or more outlets as previously discussed. In this embodiment, the separable branching conduit may be held in place with a fastener such as a screw or a pin. Accordingly, disposing the diverter within a separable branching conduit promotes efficient manufacturing and assembly processes, in addition to providing greater durability in the diverter structure.

In yet another embodiment, one or more nose pad ventilation apertures is disposed on the nose pads located on the bridge of the eyewear. In this embodiment, the nose pad ventilation apertures direct air flow across the inner face and along the eye wire at the bottom of the eyewear frames and against a wearer's cheek. Accordingly, the air flow across the inner face helps to reduce fogging of the lenses and promote fluid drainage along the eye wire. Further, the air flow directed across the inner face by the nose pad ventilation apertures may be disposed in fluid communication with the air flow directed across the inner face by the inner face outlet of the diverter. In this manner, fluid drainage and a reduction in fogging is further increased.

In a further embodiment, the nose pad ventilation apertures extend through the nose rubbers attached to the nose pads of the eyewear. The nose pad ventilation apertures direct air flow as previously discussed. Accordingly, in this embodiment, the wearer obtains the benefits of the nose pad ventilation apertures, such as a reduction of fogging of the lenses and the promotion of fluid drainage, while simultaneously enjoying the increased mechanical grip from the nose rubbers.

In another embodiment, a flexing mechanism is disposed in the frame and in connection with the front element and the temple bar, such that the flexing mechanism may allow the temple bar to flex open. In at least one embodiment, the flexing mechanism is comprised of at least one biasing member, such as a coil spring, which provides spring pressure for the flexing of the temple bar. Further, in at least one embodiment, the flexing mechanism is further disposed in connection with the separable branching conduit. In such an embodiment, the at least one coil spring disposed within the flexing mechanism provides spring pressure, thus allowing the separable branching conduit to shuttle back and forth. Further, in this embodiment the shuttling of the branching conduit enables the branching conduit to remain fully open while the temple bar is flexed open, thus maintaining air flow.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1A is a front view of eyewear in accordance with one embodiment of the present invention.

FIG. 6C is a perspective view of the embodiment depicted in FIG. 6A-6B.

DETAILED DESCRIPTION

Figure 1B:
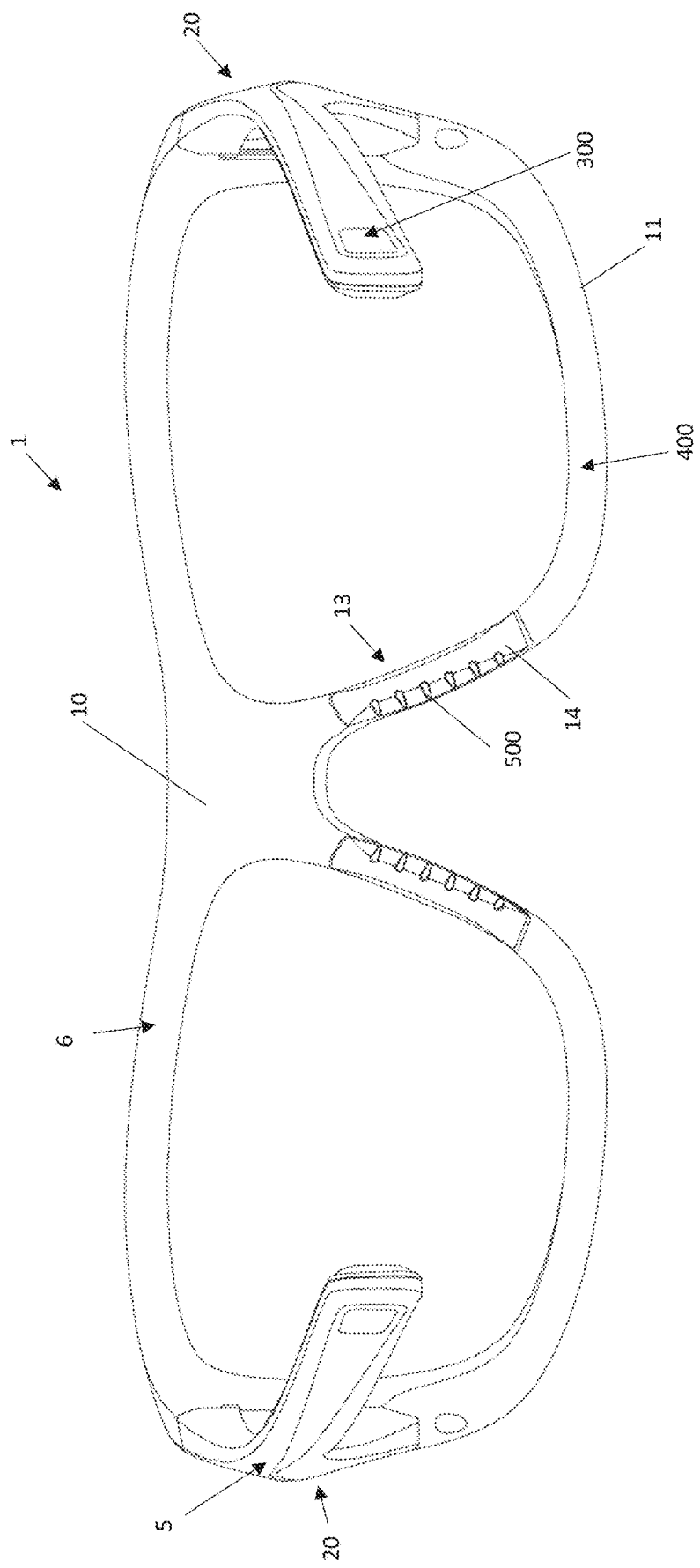
FIG. 1B is a rear view of the embodiment depicted in FIG. 1A.
Figure 1C:
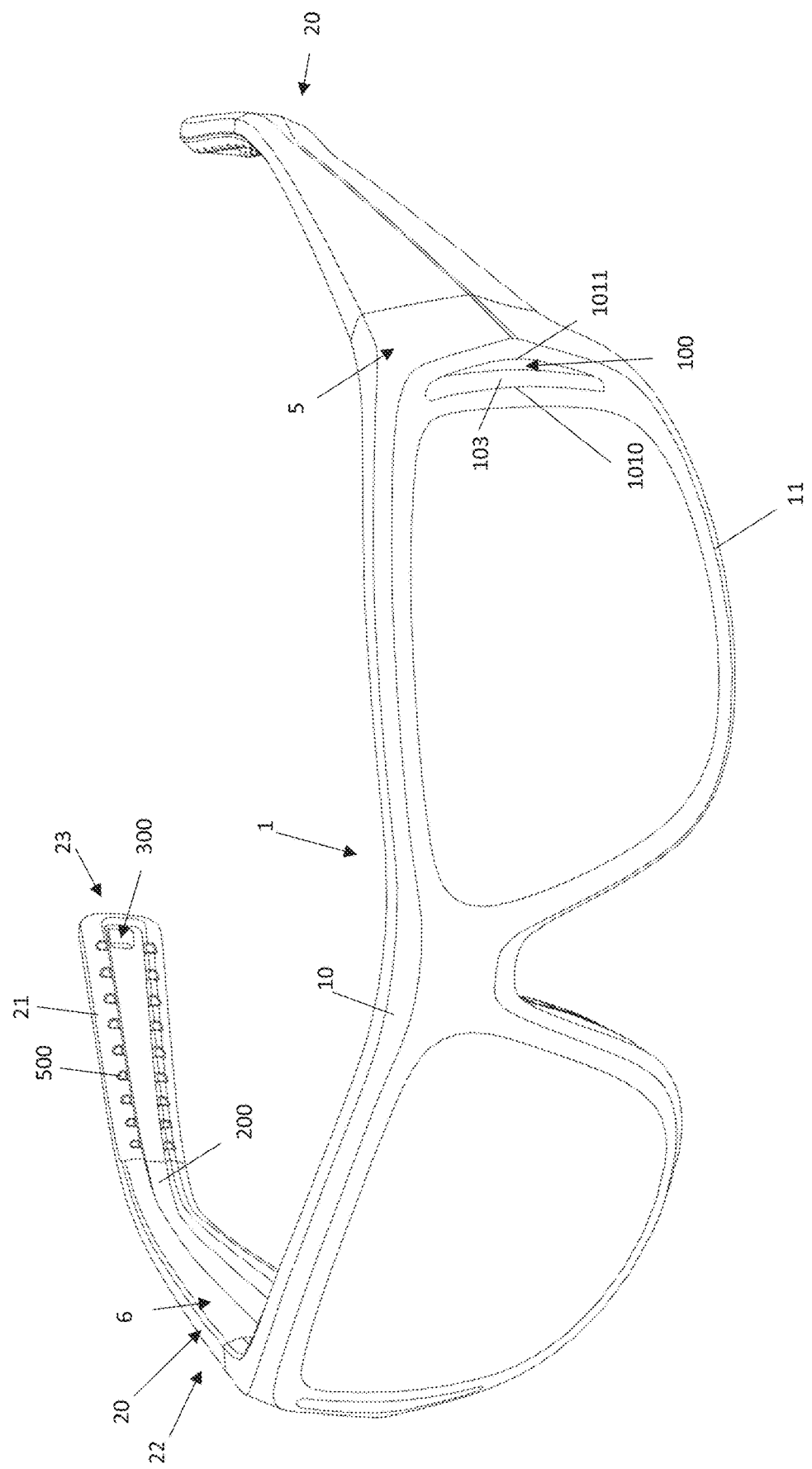
FIG. 1C is a perspective view of the embodiment depicted in FIGS. 1A-1B.
Figure 1D:
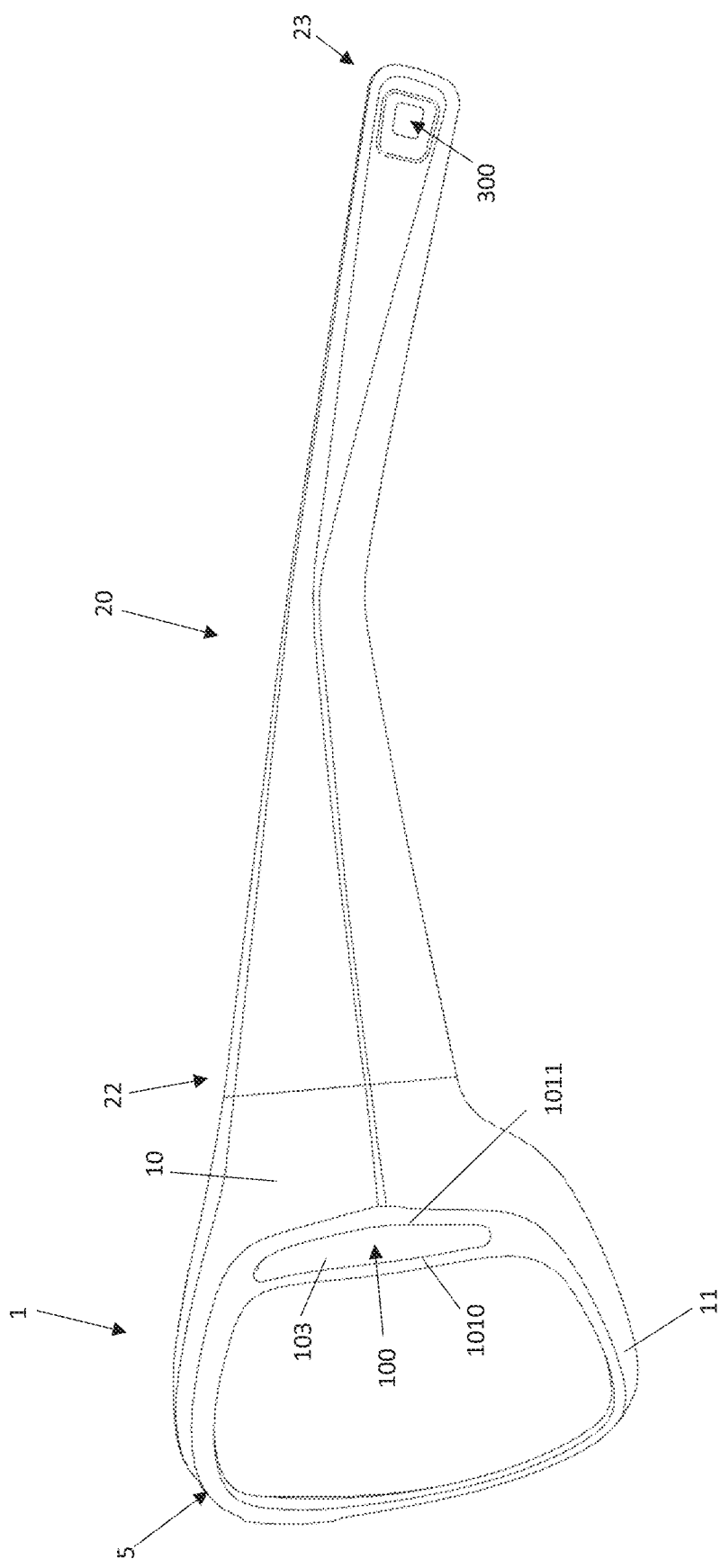
FIG. 1D is a side view of the embodiment depicted in FIGS. 1A-1C.

Turning to FIGS. 1A-1F, depicted therein are several operative features of the invention employed on a particular embodiment of a frame 1. The frame 1 includes an outer face 5, inner face 6, a front element 10, and a pair of temple bars 20. As can be seen in the depicted embodiment, the inlet 101 of the ventilation aperture 100 is disposed on the front element 10, adjacent to the eye wire 11. The outlet 102 is disposed in direct, fluid communication with the fluid channel 200. Additionally, the ventilation aperture 100 is oriented substantially in alignment with the fluid channel 200 such that air may be conducted directly to the fluid channel 200 without significant deviation.

Figure 1E:
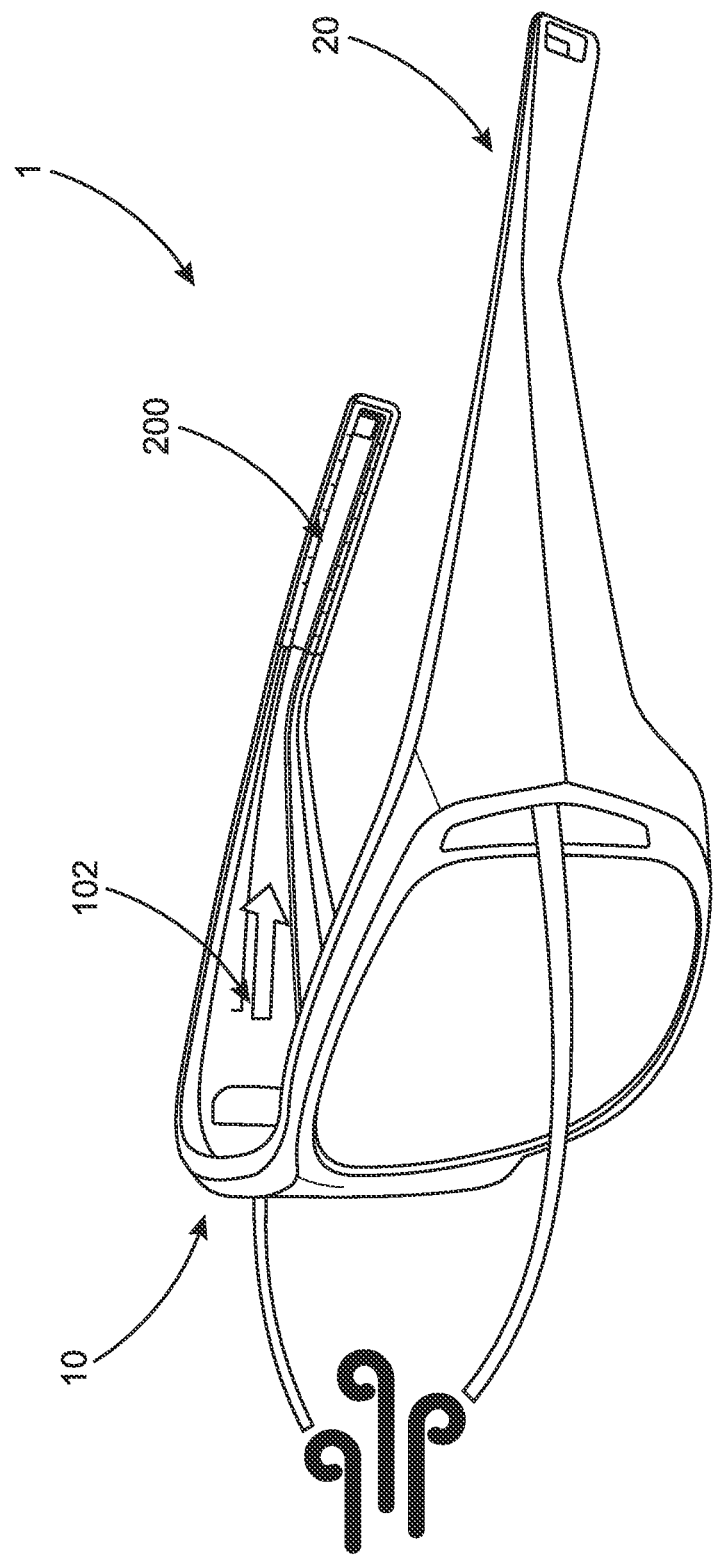
FIG. 1E is a perspective view of the embodiment depicted in FIGS. 1A-1D.
Figure 1F:
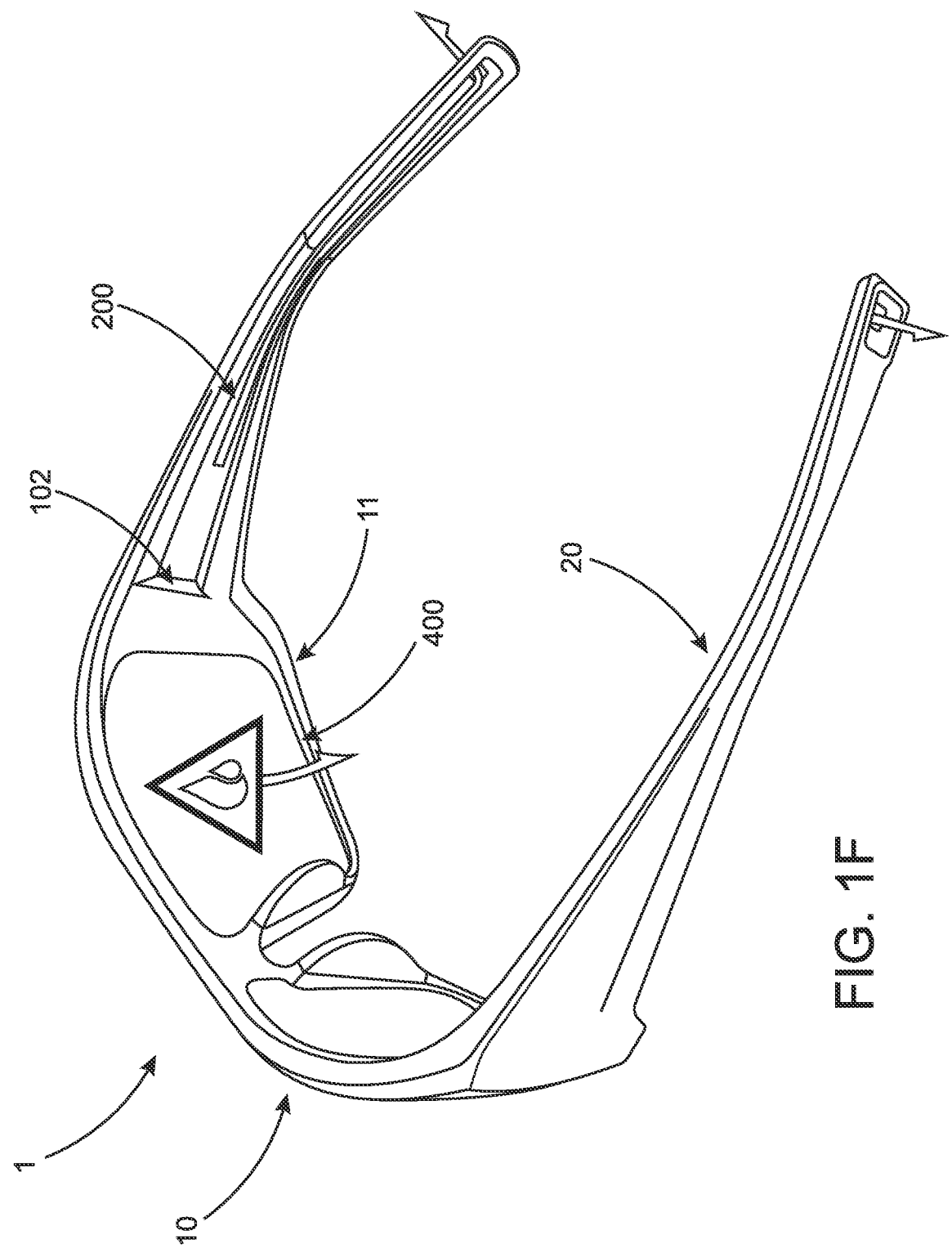
FIG. 1F is a perspective view of the embodiment depicted in FIGS. 1A-1E.
Figure 2A:
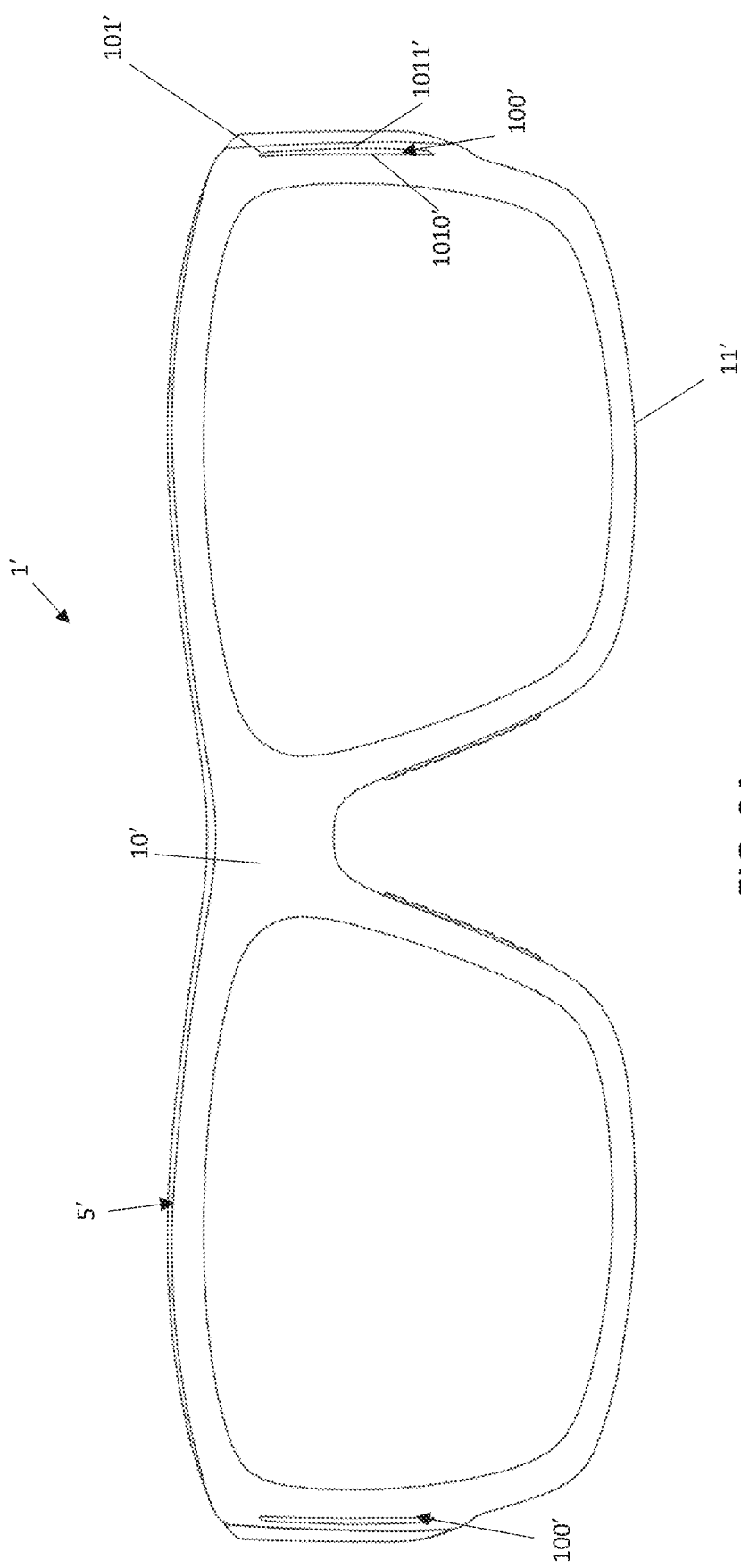
FIG. 2A is a front view of eyewear in accordance with another embodiment of the present invention.
Figure 2B:
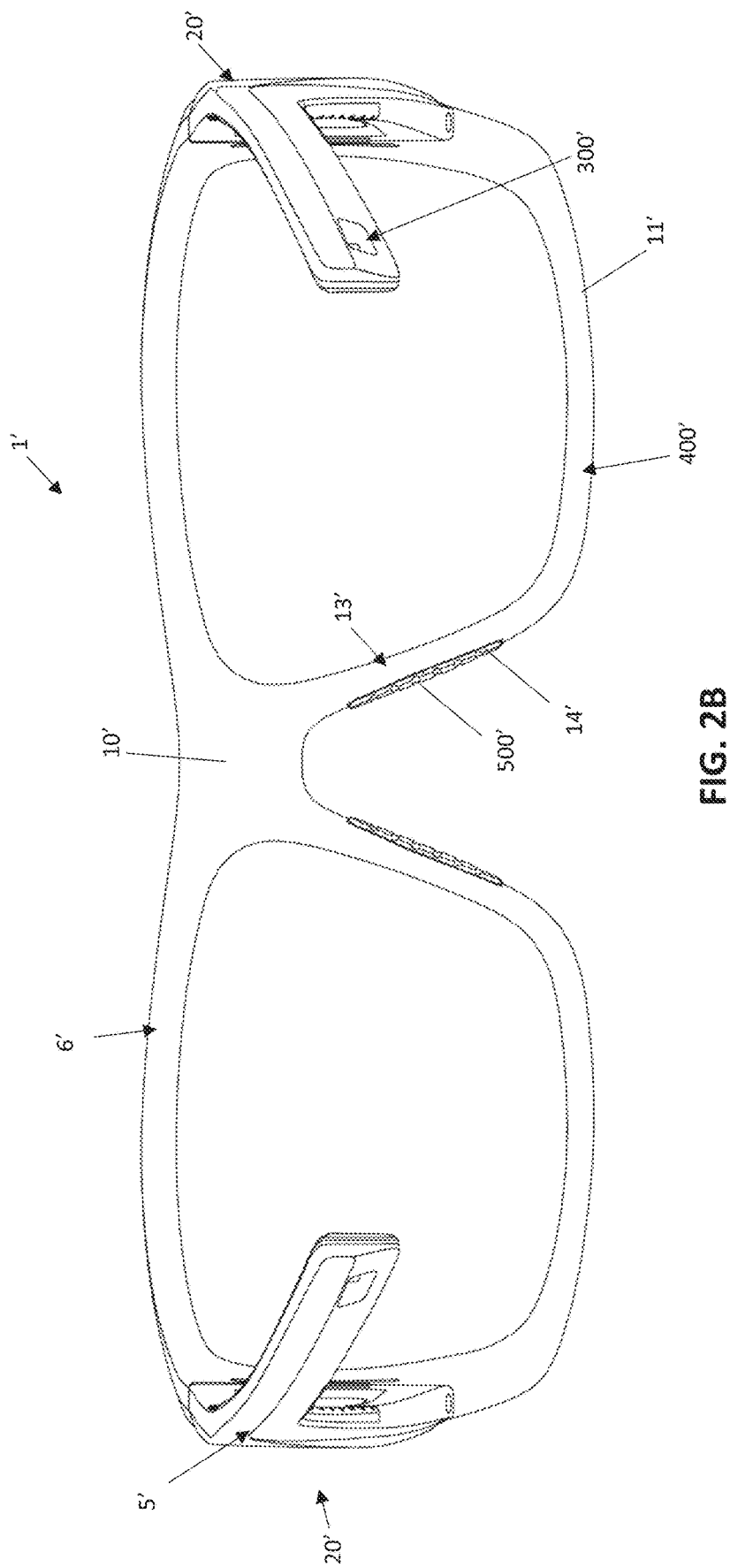
FIG. 2B is a rear view of the embodiment depicted in FIG. 2A.
Figure 2C:
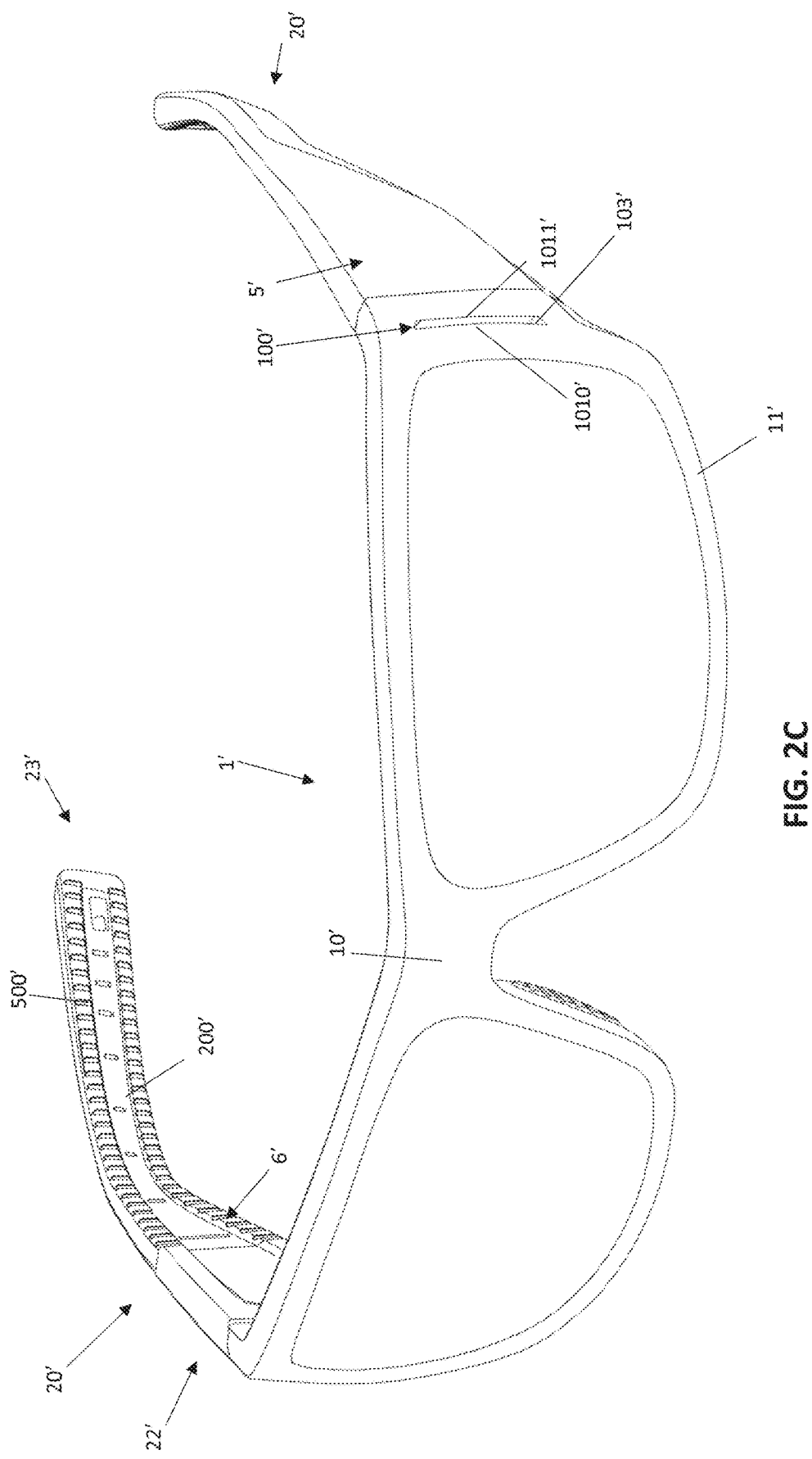
FIG. 2C is a perspective view of the embodiment depicted in FIGS. 2A-2B.
Figure 2D:
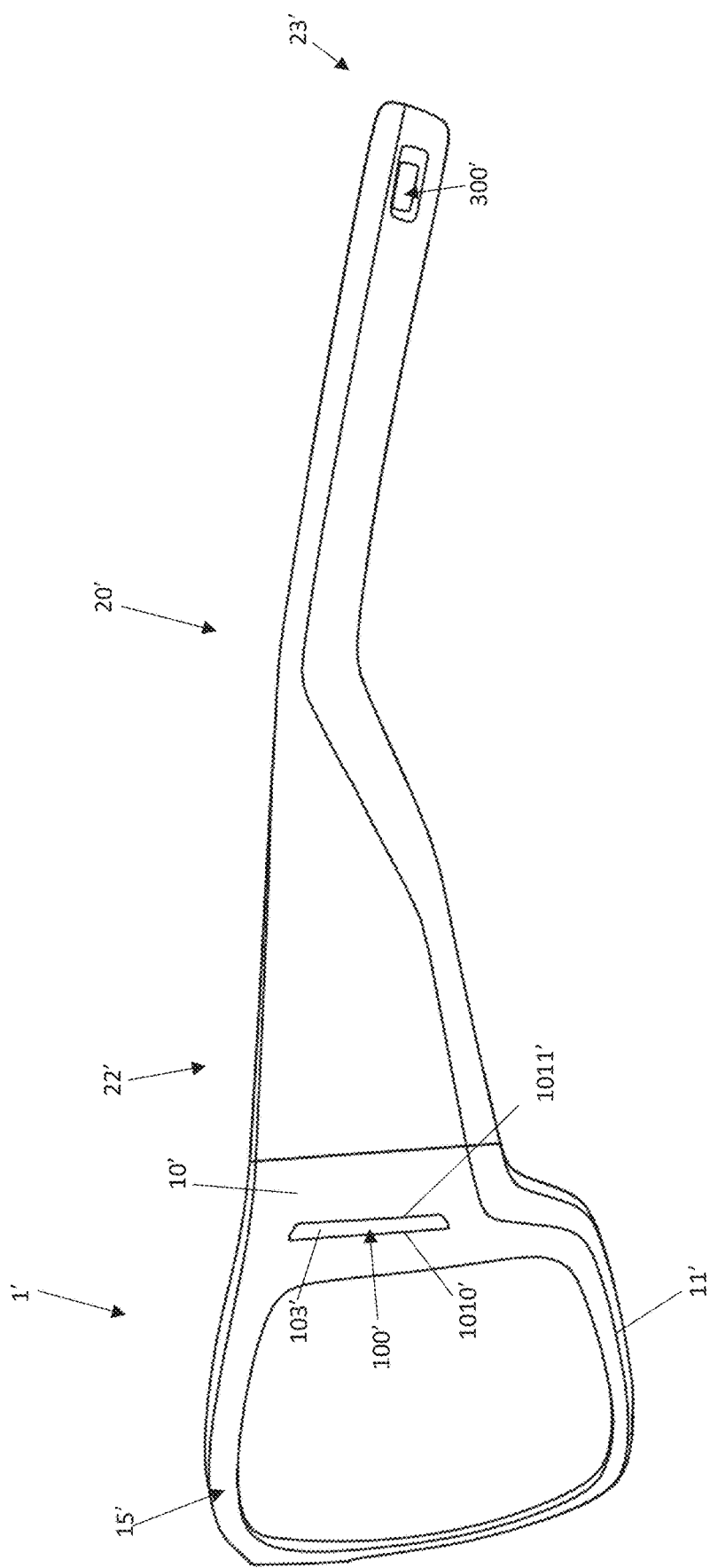
FIG. 2D is a side view of the embodiment depicted in FIGS. 2A-2C.
Figure 2E:
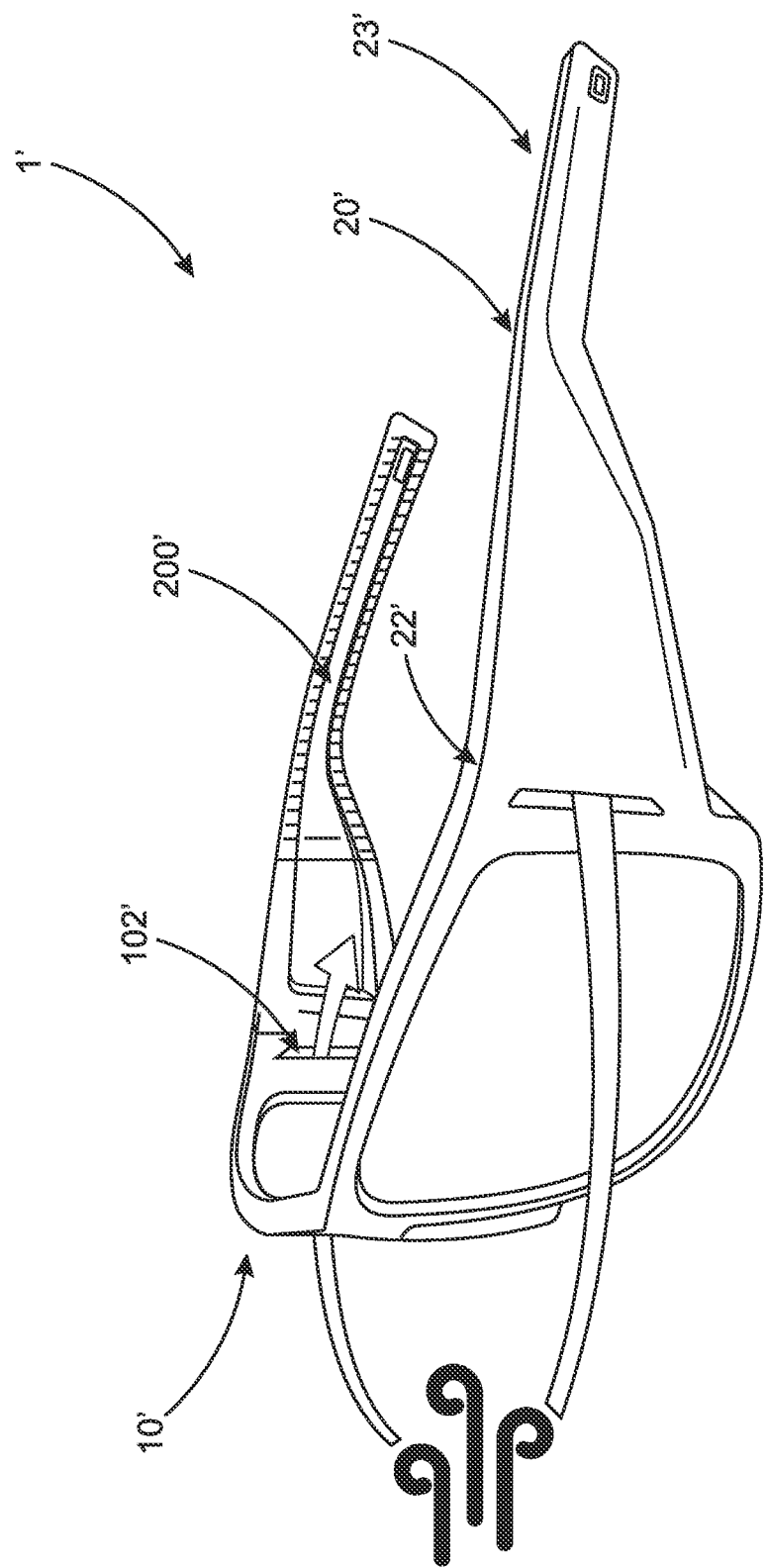
FIG. 2E is a perspective view of the embodiment depicted in FIGS. 2A-2D.
Figure 2F:
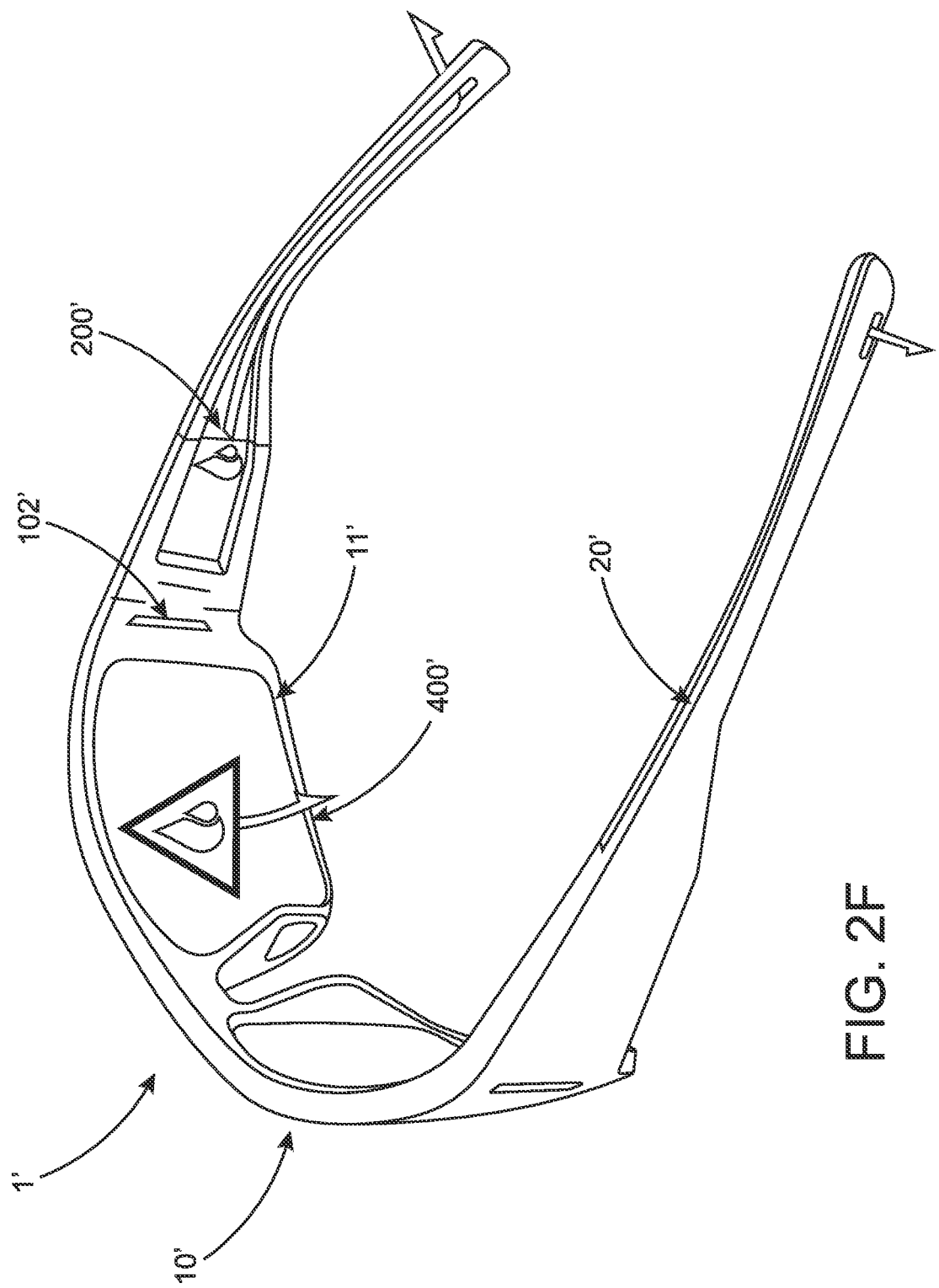
FIG. 2F is a perspective view of the embodiment depicted in FIGS. 2A-2E.

Particularly as can be seen in FIG. 1E, the ventilation aperture 100 of the depicted embodiment includes a length at least partially defined by an interior surface 103. Additionally, the proximal side 1010 of the inlet 101 is disposed further forward than the distal side 1011 of the inlet. While this facilitates capture and redirection of flowing air into the front element 10, it also creates an aperture with significant exposure to light and elements. As such, the interior surface 103 of the ventilation aperture 100 extends rearward past the distal side 1011 of the inlet 101. Accordingly, any light, fluid, or debris that would otherwise enter the aperture at an angle sufficient to meet the wearer's cornea is blocked from doing so. Any such light, fluid, or debris is either reflected off of the interior surface 103 or refracted or redirected along a path substantially along the fluid channel 200, and substantially away from the wearer's cornea.

In the depicted embodiment, the fluid channel 200 is disposed within the temple bar 20 along the inner face 6 thereof. The fluid channel 200 meets the outlet 102 at the proximal end 22 of the temple bar 20. The fluid channel 200 runs substantially along the length of the temple bar 20 and terminates at the distal end 23 of the temple bar 20. As can be seen, the depth of the fluid channel 200 is less than the thickness of the temple bar 20. As such, the fluid channel 200 of the depicted embodiment is defined substantially by a void within the temple bar 20, but does not extend all the way through the temple bar 20. As such, ventilation may be provided for within the temple bar 20 without including apertures there through.

At the distal end 23 of the temple bar 20, a drain aperture 300 is disposed through the temple bar 20 and in fluid communication with the fluid channel 200. As such, fluid, including air, perspiration, or other moisture, may flow along the fluid channel 200, conducted by the air entering through the ventilation aperture 100, and urge fluid out of the drain aperture 300, to the extent that it does not evaporate.

As can be seen best in FIGS. 1B and 1E, along the inner face 6 of the front element 10, the eye wire 11 serves to retain the lower portion of the lens. As such, a certain thickness of material is generally desired in order to securely encase the lower portion of the lens. Yet, as discussed, this can create a surface upon which moisture may collect, a problem that is exacerbated if the wearer's cheek rests against the eye wire 11. Accordingly, the eye wire of the present invention includes a recessed portion 400 in which a minimum dimension of material is utilized to retain the lens against the eye wire 11. In the depicted embodiment, the recessed portion 400 does not run along the entire length of the eye wire 11 but is only included at the lower portions to facilitate drainage. The remaining portion of the eye wire 11 may be of larger dimension, as desired, to provide rigidity and secure the lens.

Some portions of the frame 1 may utilize rubber or rubberized surfaces to facilitate adherence to a wearer, in particular, nose rubber 14 disposed on the nose pad 13 and temple bar rubber 21 disposed on the inner surface 16 of the temple bar 20. The depicted embodiment includes ridges 500 disposed on the surface of the nose rubber 14 and temple bar rubber 21. The ridges 500, which may be at least partially defined by debosses in the surface of the rubber, facilitate drainage of moisture and increase mechanical grip on the wearer.

Now turning to FIGS. 2A-2F, various features and elements of the present invention are depicted on another embodiment of a frame 1'. The depicted frame 1' includes an outer face 5', and inner face 6', a front element 10', and a pair of temple bars 20'. The ventilation apertures 100' are narrower in dimension than as depicted in the embodiment of FIG. 1A and, due to the curvature of the front element 10' in the embodiment of FIGS. 2A-2F, the inlets 101' are oriented substantially perpendicularly to the temple bars 20', while the outlets 102' have been dimensioned and configured to direct air flow generally along the temple bars 20'.

Additionally, the fluid channel 200' of the depicted embodiment is not in direct fluid communication with the ventilation aperture 100'. Rather, the fluid channel 200' begins at a proximal end 22' of the temple bar 20' and ends at the proximal end 22' of the temple bar 20'. It will be appreciated that the fluid channels 200' may be dimensioned and configured such that the face of a wearer will not create a seal against the fluid channel and, therefore, fluid may enter the fluid channel 200' at the proximal end 22' without requiring a direct, fluid communication with the ventilation aperture 100'. The depicted embodiment offers the advantages of the present invention in a differing aesthetic than, e.g., that depicted in FIGS. 1A-1F, due to, inter alia, the reduced dimension of the ventilation apertures 100', especially as compared to the ventilation apertures 100 in FIGS. 1A-1F.

Figure 3A:
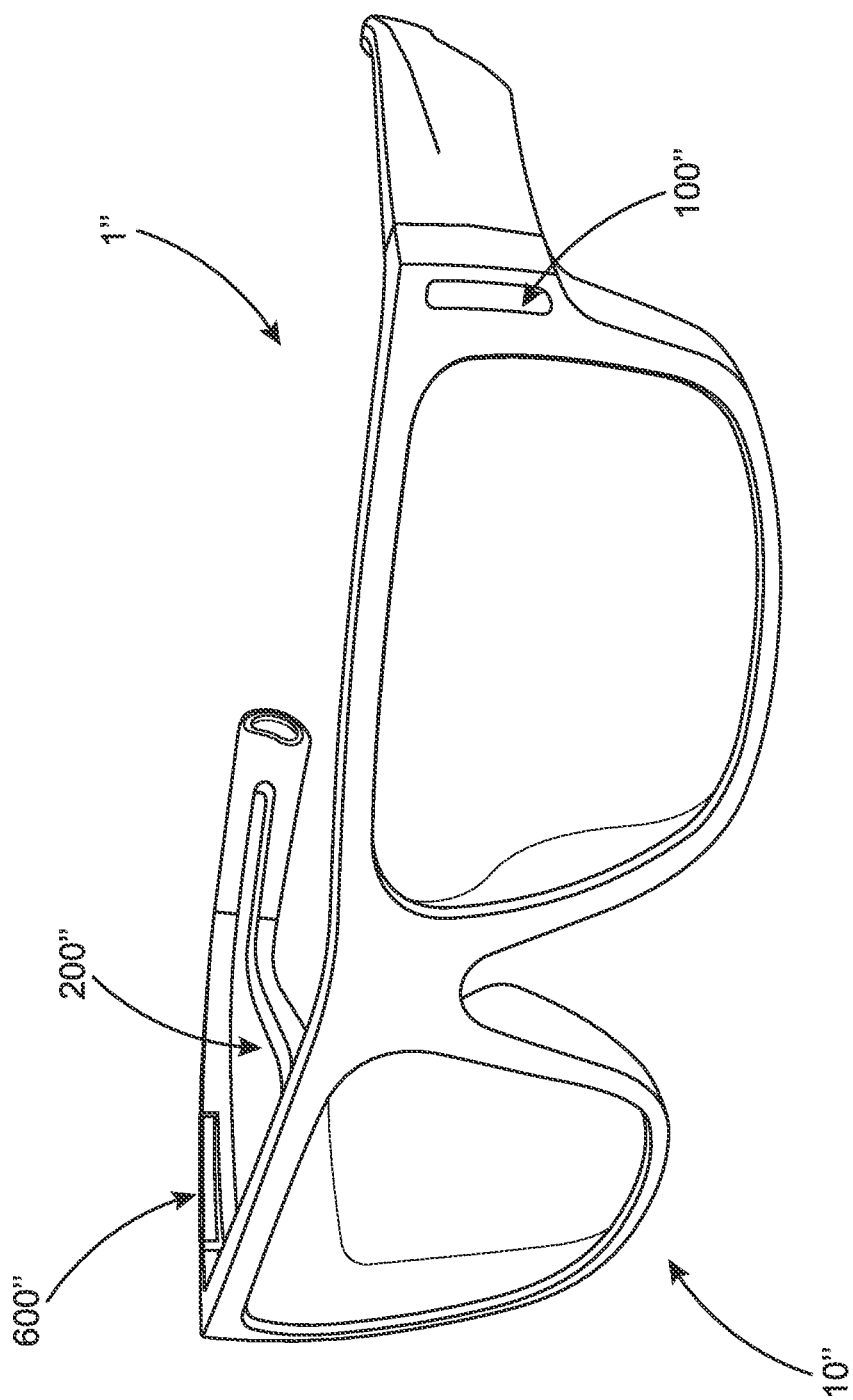
FIG. 3A is a perspective view of eyewear in accordance with another embodiment of the present invention.
Figure 3B:
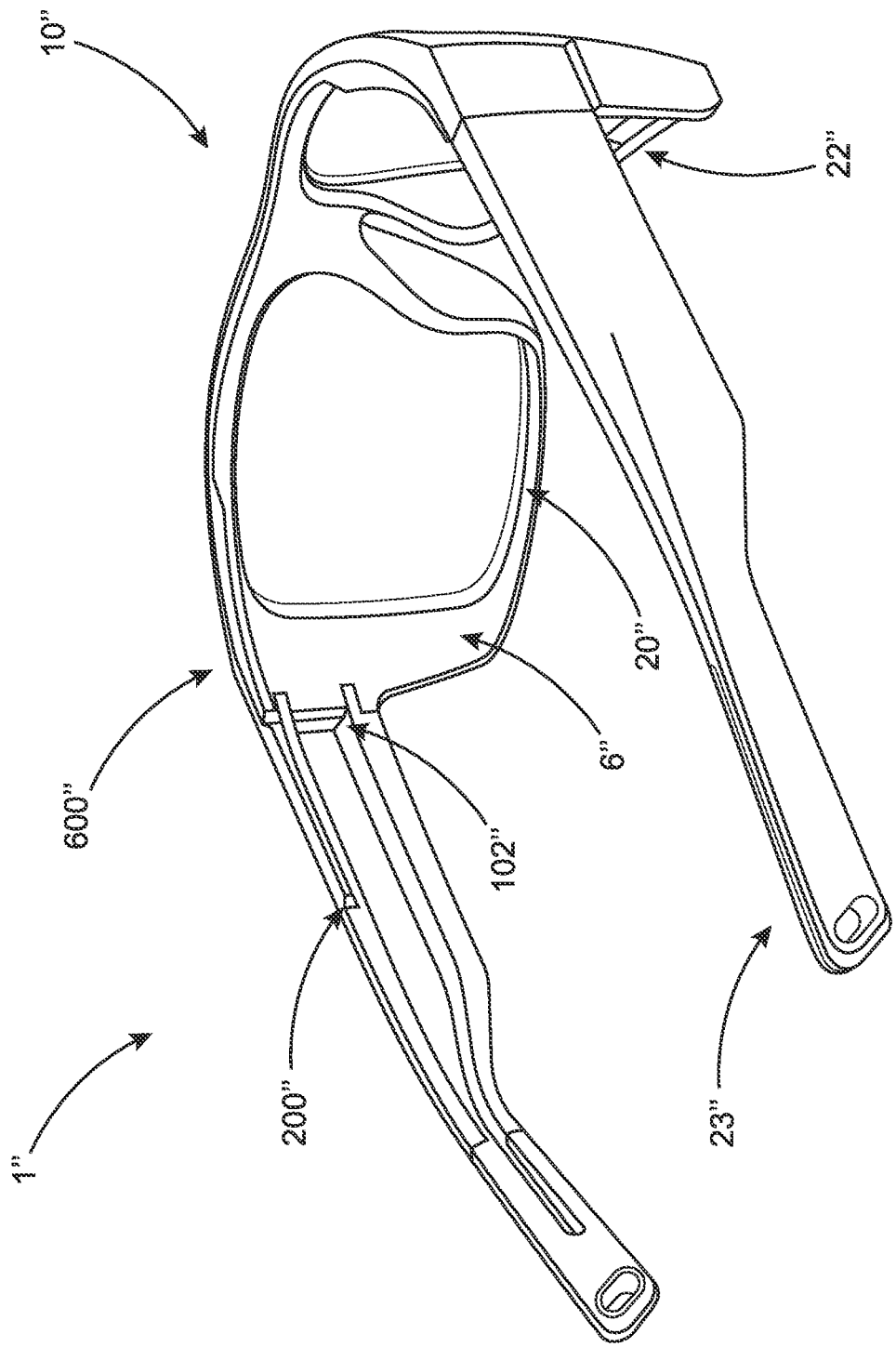
FIG. 3B is a perspective view of the embodiment depicted in FIG. 3A.

With regard to FIGS. 3A-3B, eyewear in accordance with yet another embodiment of the present invention is depicted. The frame 1" includes a front element 10" and temple bars 20". The ventilation aperture 100" includes an outlet 102" that is disposed in direct, fluid communication with the fluid channel 200". The fluid channel 200" terminates on the distal end 23" of the temple bar 20", even though, in the depicted embodiment, the fluid channel 200" is not disposed n fluid communication with a drain aperture. The depicted embodiment also includes a peripheral shade 600" along the upper edge of the inner face 6". The peripheral shade 600" may include a protrusion along the front element 10" and/or temple bar 20" which blocks additional light from a peripheral direction.

Figure 4A:
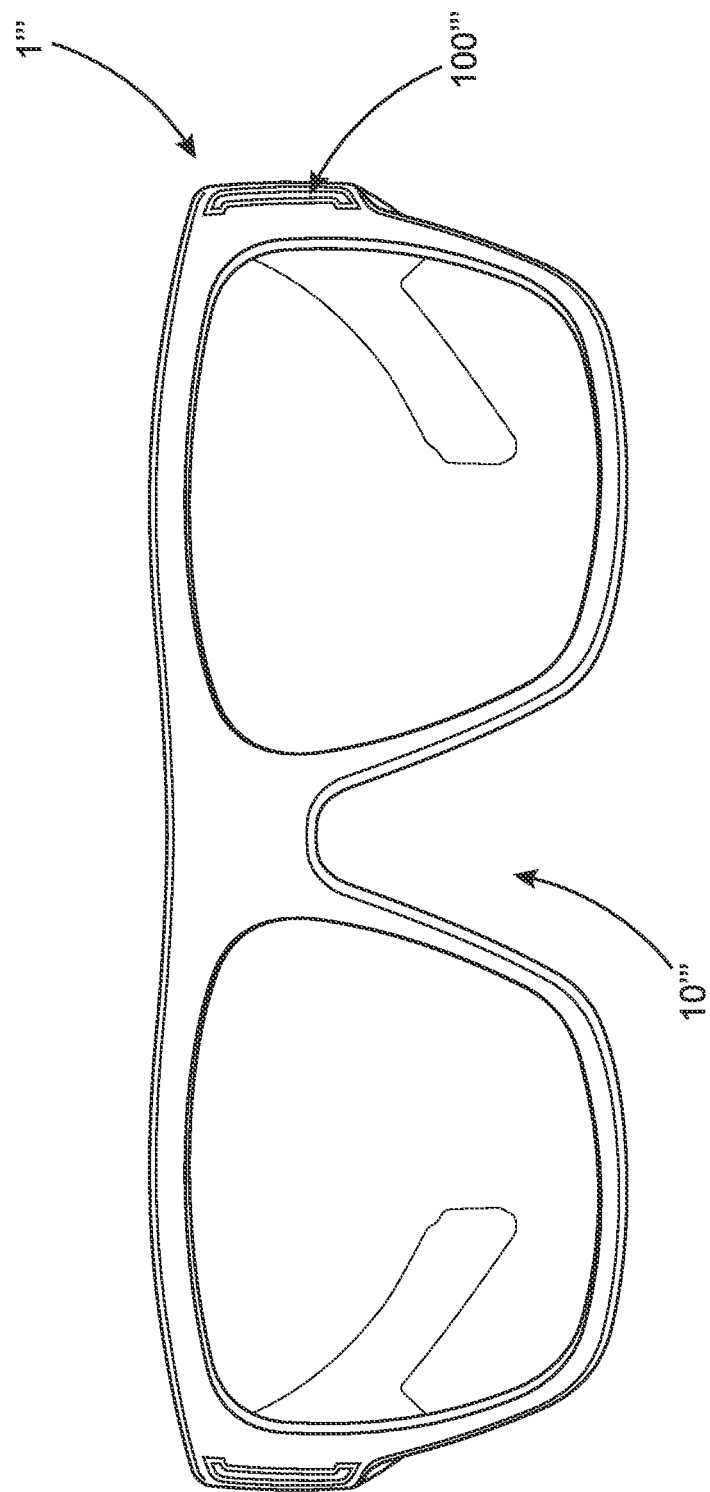
FIG. 4A is a perspective view of eyewear in accordance with another embodiment of the present invention.
Figure 4B:
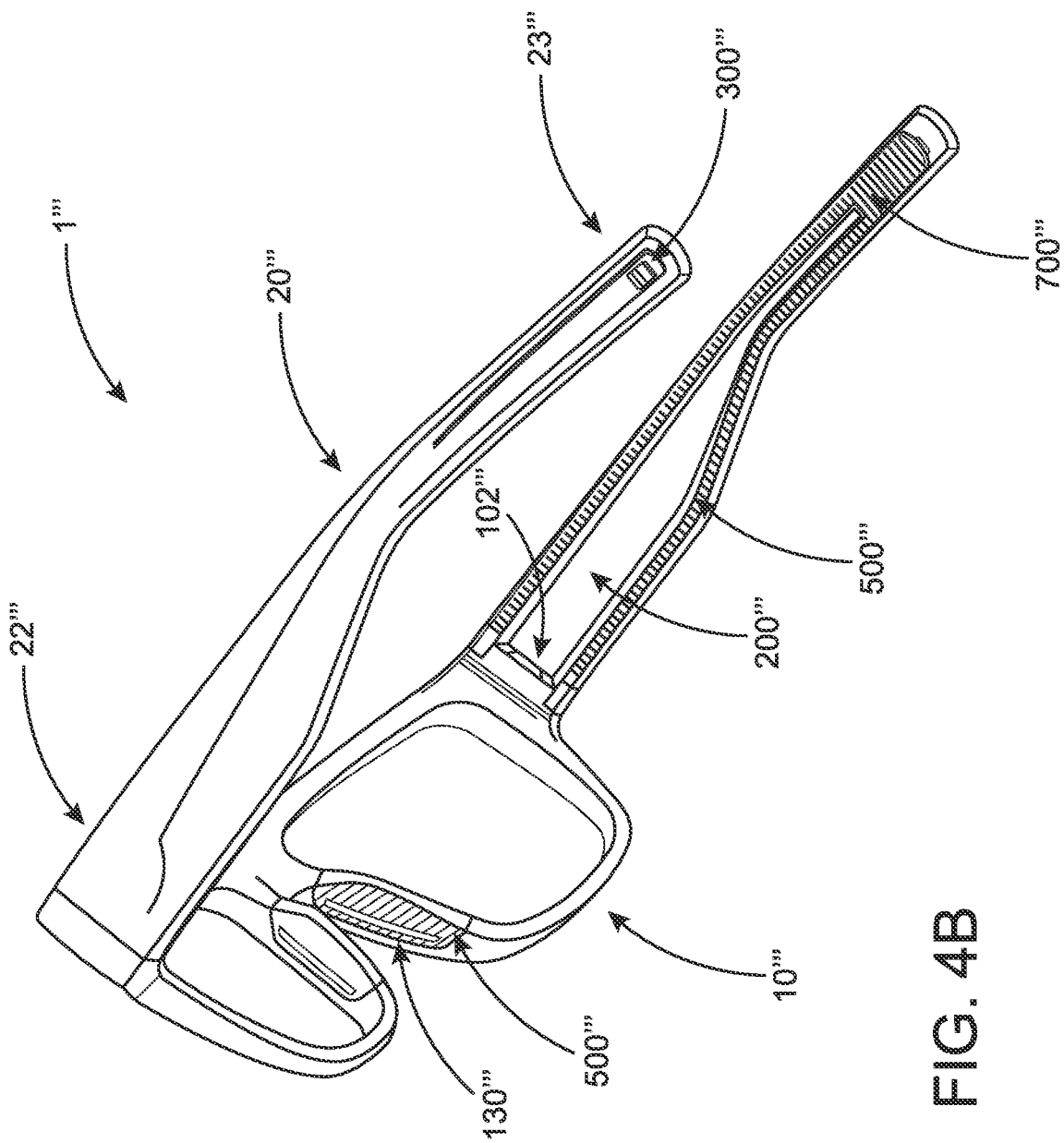
FIG. 4B is a perspective view of the embodiment depicted in FIG. 4A.

With regard to FIGS. 4A-4B, eyewear in accordance with yet another embodiment of the present invention is depicted. The frame 1''' includes a front element 10''' and temple bars 20'''. As can be seen, the ventilation aperture 100''' includes an outlet 102''' that is disposed in direct, fluid communication with the fluid channel 200'''. The fluid channel 200''' is further disposed in fluid communication with a drain aperture 300'''. As can be seen, the fluid channel 200''' is only exposed to a wearer along a portion of its length, due to the covering portion 700''', which in the depicted embodiment includes a portion of the temple bar rubber 21'''. Additionally, the depicted embodiment includes a nose pad ventilation aperture 130''' disposed through the nose pad which facilitates air circulation and heat exchange there through.

Figure 5A:
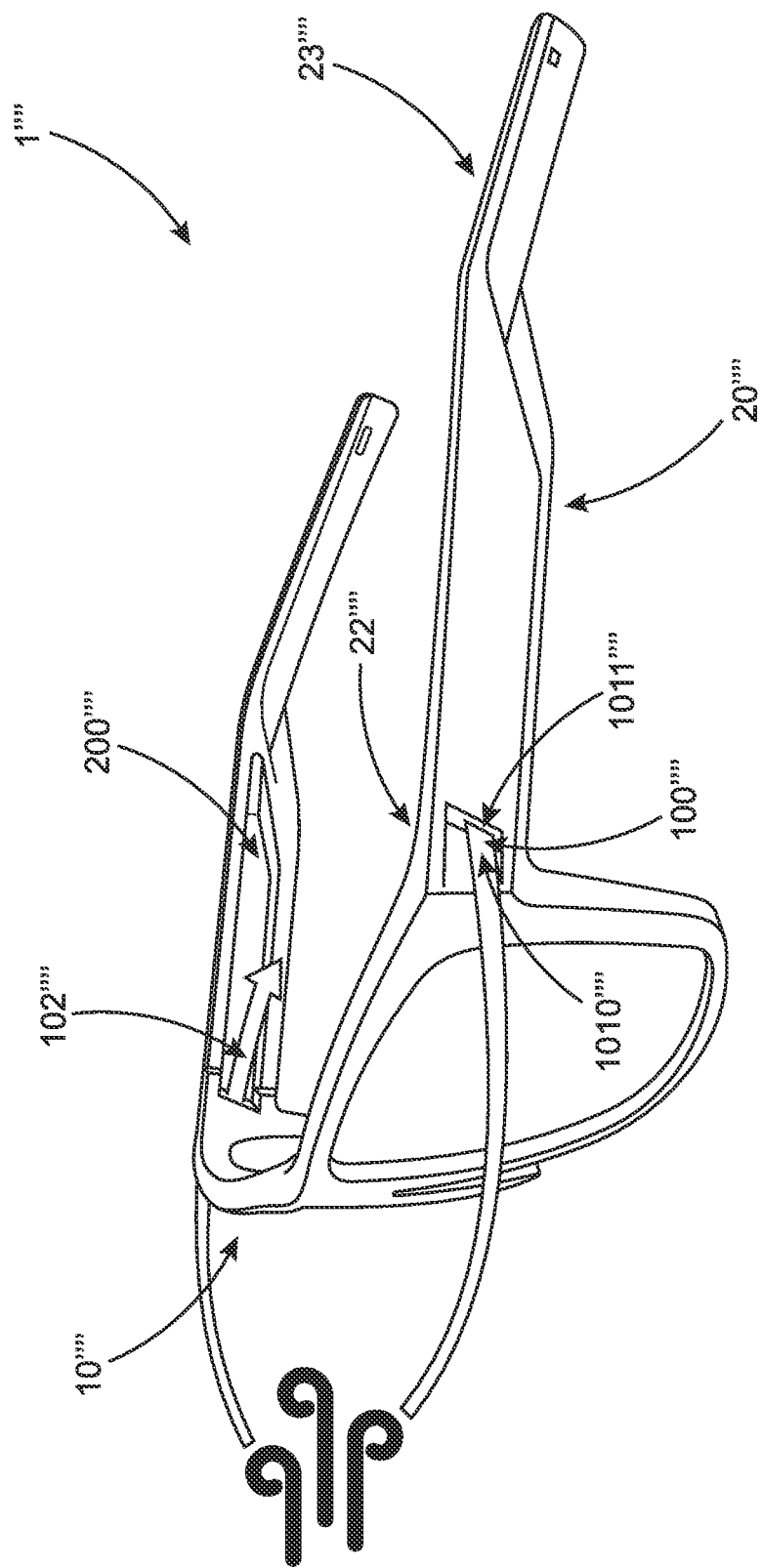
FIG. 5A is a perspective view of eyewear in accordance with another embodiment of the present invention.
Figure 5B:
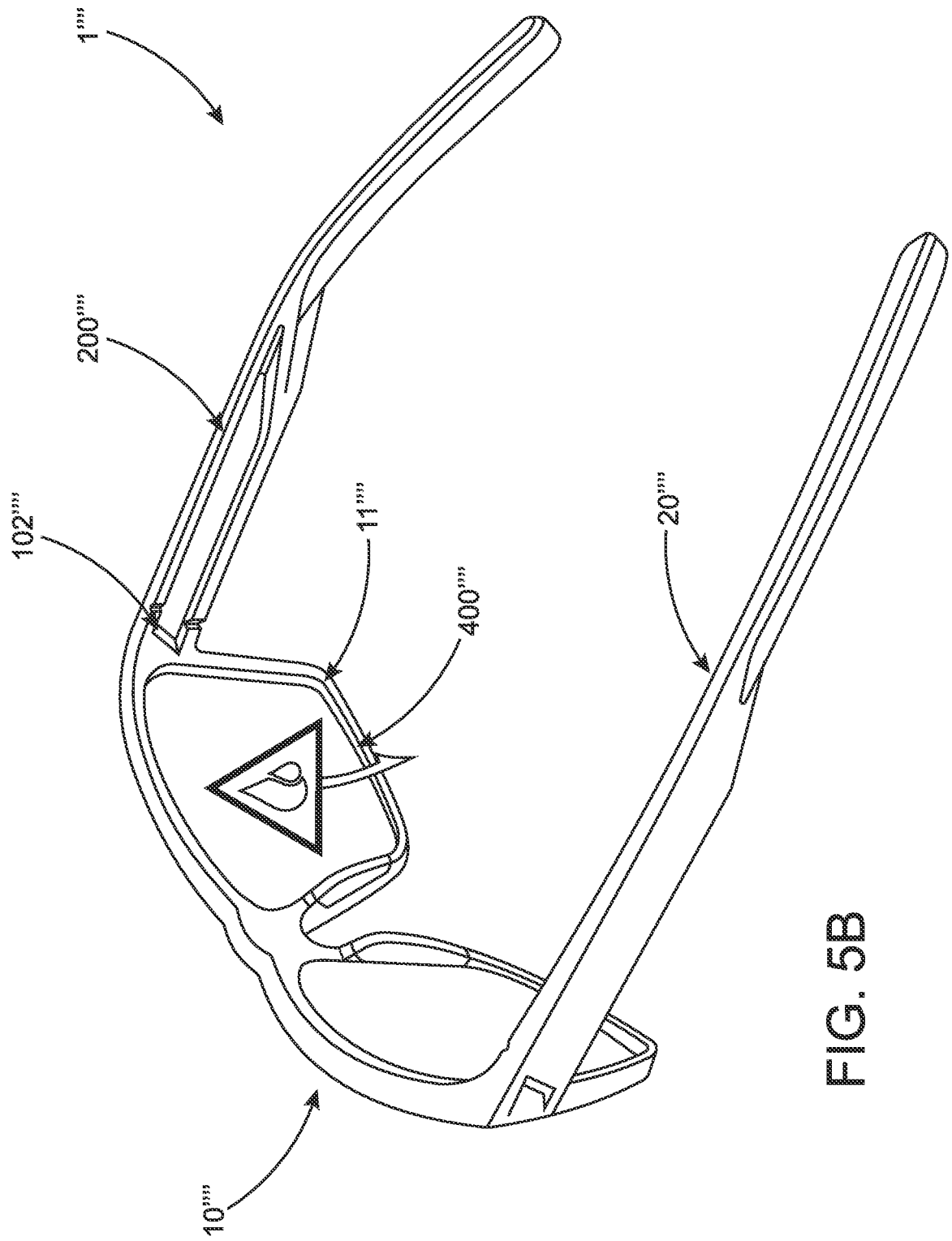
FIG. 5B is a perspective view of the embodiment depicted in FIG. 5A.

Now turning to FIGS. 5A-5B, depicted therein are the operative features of the present invention deployed on yet another embodiment of a frame 1''''. As such, the features and objectives of the present invention may be applied to enhance styles of eyewear other than those strictly developed for active situations. Specifically, 3A-3F depicts a frame 1'''' with geometries and proportions selected more for aesthetic appearance, rather than performance. By way of example, the curvature of the front element 10'''' is not as severe as those depicted in FIGS. 1A-2F. Additionally, the temple bars 20'''' are relatively short in height, being selected for aesthetic qualities rather than light-blocking characteristics. However, as can be seen, ventilation apertures 100'''' are disposed through the proximal end 22'''' of the temple bars 20''''. Given that the temple bars 20'''' will not block a significant portion of peripheral light in the depicted embodiment, whether peripheral light is allowed to enter the ventilation aperture 100'''' is less of a concern. Accordingly, the ventilation aperture 100'''', along with the shape and geometry of its inlet 101'''' and outlet 102'''' can be optimized for airflow there through. Additionally, the ventilation aperture 100'''' is disposed across both the front element 10'''' and temple bar 20'''', with the proximal side 1010'''' disposed on the front element 10'''' and the distal side 1011'''' disposed on the temple bar 20''''.

The fluid channels 200'''' are, in the depicted embodiment, disposed in direct fluid communication with the ventilation apertures 100'''' yet do not extend substantially along the temple bars 20'''', but terminate between the proximal 22'''' and distal 23'''' ends.

Turning to FIGS. 6A-10, depicted therein are several operative features of the invention employed on various embodiments of a frame 1'''''. The frame 1''''' includes an outer face 5''''', inner face 6''''', a front element 10''''', a pair of temple bars 20''''', and at least one nose pad 13'''''. As can be seen in the depicted embodiments, the inlet 101''''' of the ventilation aperture 100''''' is disposed on the front element 10'''''. The outlet 102''''' of the ventilation aperture 100''''' is disposed in direct, fluid communication with the fluid channel 200'''''. Additionally, the ventilation aperture 100''''' is oriented substantially in alignment with the fluid channel 200''''' such that air may be conducted directly to the fluid channel 200''''' without significant deviation.

Figure 6A:
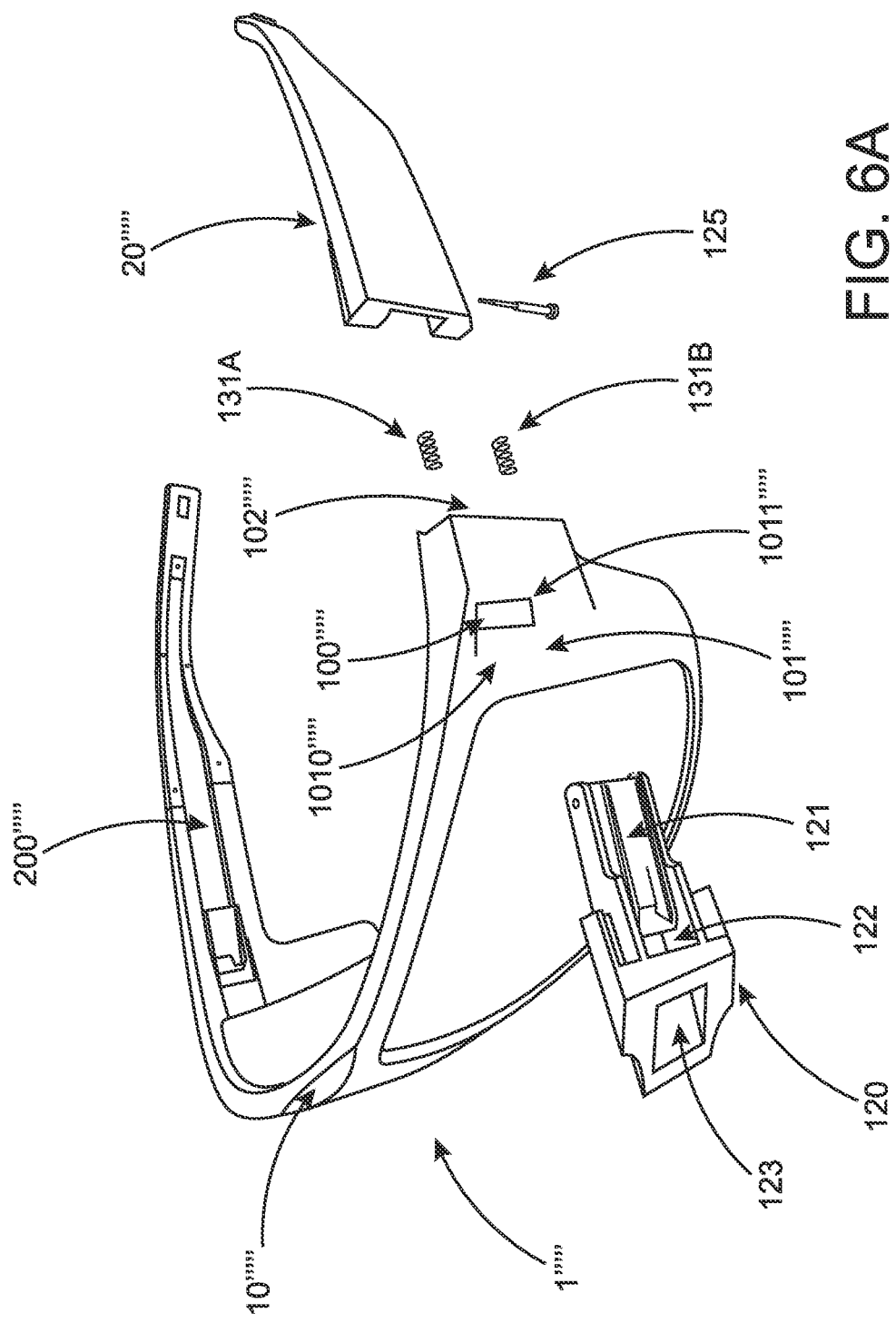
FIG. 6A is a perspective view in exploded form of eyewear in accordance with one embodiment of the present invention.
Figure 6B:
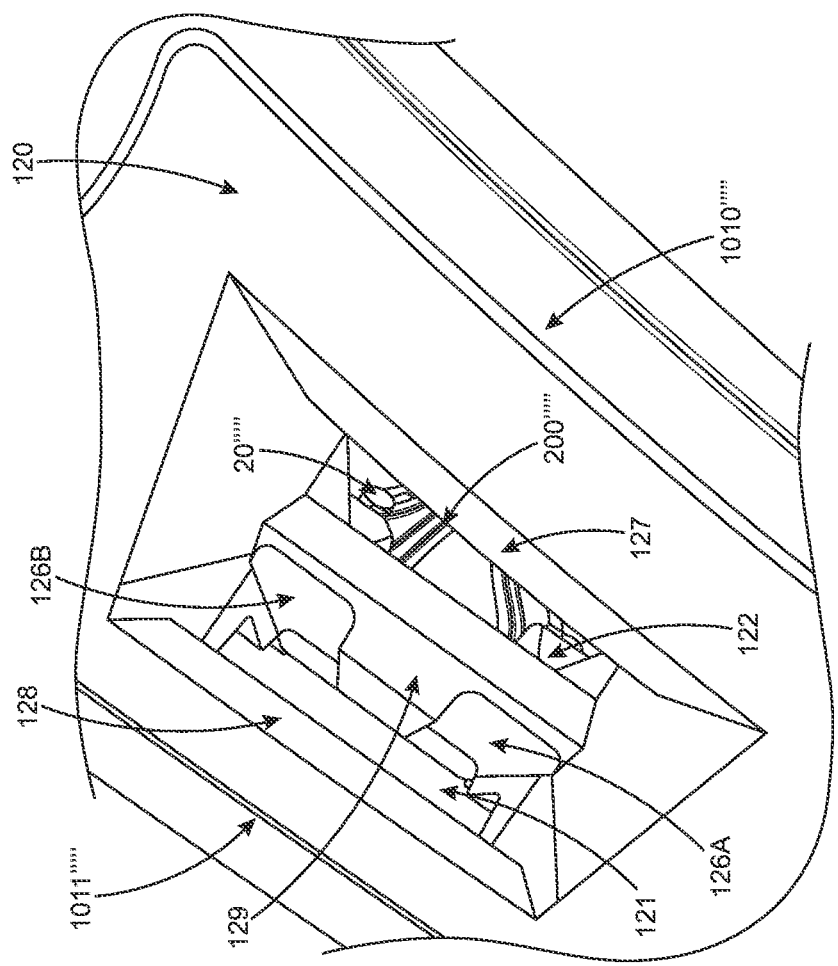
FIG. 6B is a perspective view of details of the embodiment depicted in FIG. 6A.
Figure 7:
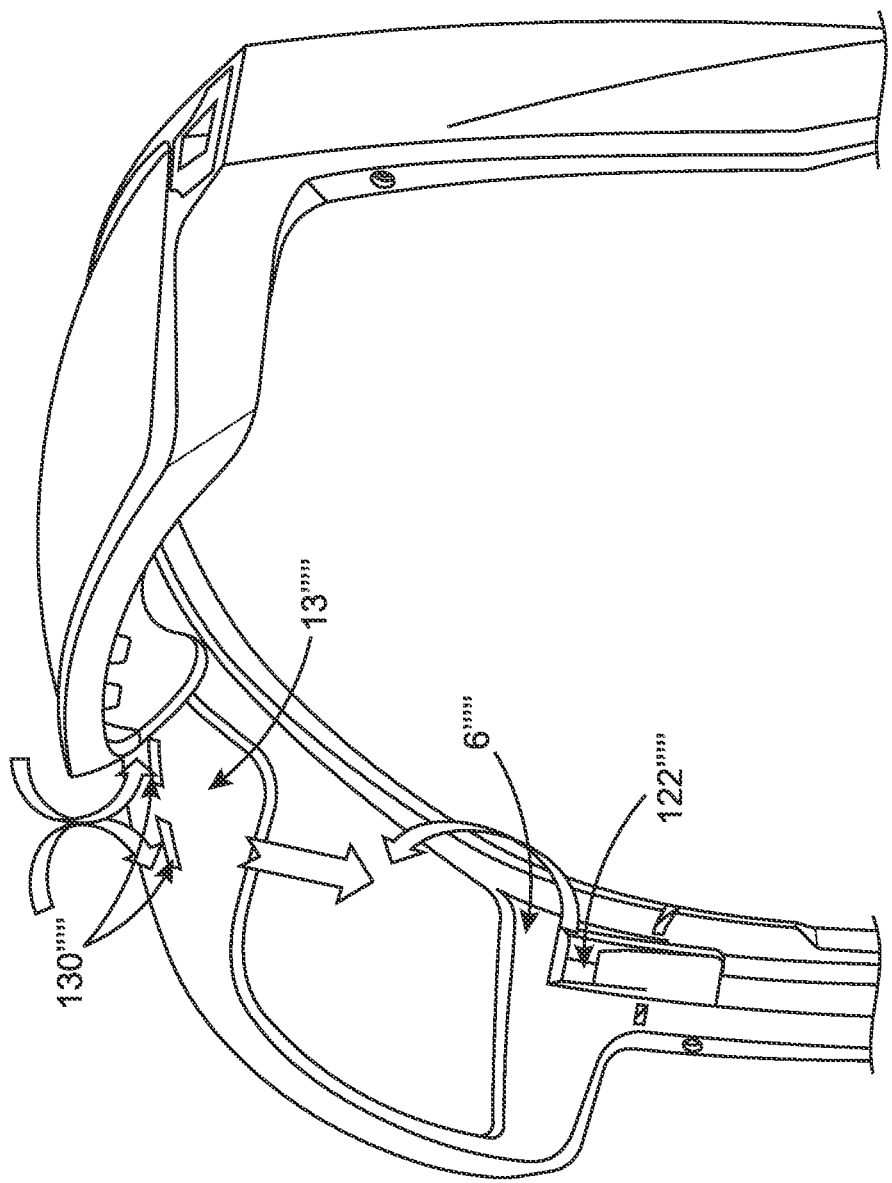
FIG. 7 is a perspective view of eyewear in accordance with another embodiment of the present invention.

Turning to the embodiments depicted in FIGS. 6A-6C, a diverter 129 is disposed within the ventilation aperture 100'''''. In this embodiment, the diverter 129 is disposed within a separable branching conduit 120, which is disposed within the ventilation aperture 100'''''. In such an embodiment, the inlet 123 for the diverter 129 comprises the space between a proximal side 127 and a distal side 128 of the separable branching conduit 120. Further, in such an embodiment, the diverter 129 comprises a temple bar outlet 121 and an inner face outlet 122 for directing air or fluid flow respectively into the fluid channel 200''''' of the temple bar 20''''' or across the inner face 6'''''. Further, in at least one embodiment, the diverter 129 comprises two ducts 126a, 126b, which help direct airflow into the temple bar outlet 121 and further provide strength for the structure of the diverter 129. Further, in at least one embodiment, the separable branching conduit 129 may be used to connect the front element 10''''' with the temple bars 20''''' through the use of a fastener 125, such as a screw or pin.

It should be noted that although the embodiment pictured in FIGS. 6A-6C depicts the diverter 129 disposed within a separable branching conduit 120, it is possible for the diverter 129 to simply be disposed within the ventilation aperture 100'''''. In such an embodiment, the inlet 123 of the diverter 129 would comprise the space between a proximal side 1010''''' and a distal side 1011''''' of the ventilation aperture 100'''''. Further, the diverter 129 would comprise a temple bar outlet 121 for directing air flow or fluid flow into the fluid channel 200''''' and an inner face outlet 122 for directing air flow or fluid flow across the inner face 6'''''. The diverter 129 in this embodiment may also comprise at least one duct 126*a*, 126*b* to direct airflow into the temple bar outlet 121 and further provide strength for the structure of the diverter 129.

Turning to the embodiments depicted in FIGS. 6C-8, a frame 1′′′′ includes a bridge 12 comprising at least one nose pad 13′′′′ and an eye wire 11′′′′, which may include an eye wire recess 400′′′′. Further, the at least one nose pad 13′′′′ comprises at least one nose pad ventilation aperture 130′′′′ for providing airflow across the inner face 6′′′′. In such an embodiment, the at least one nose pad ventilation aperture may comprise one or more separate apertures connecting the outer face 5′′′′ and the inner face 6′′′′ in fluid communication. The airflow from the at least one nose pad ventilation aperture 130′′′′ may be directed across the inner face 6′′′′ and into fluid communication with the airflow directed across the inner face 6′′′′ by the diverter 129 through the inner face outlet 122. In this manner, the combined airflow from the nose pad ventilation apertures 130′′′′ and the inner face outlet 122 may help facilitate the fluid drainage of the inner face through the eye wire 11′′′′ and the eye wire recess 400′′′′, thus providing comfort to the wearer and further preventing fogging of the eyewear.

Figure 8:
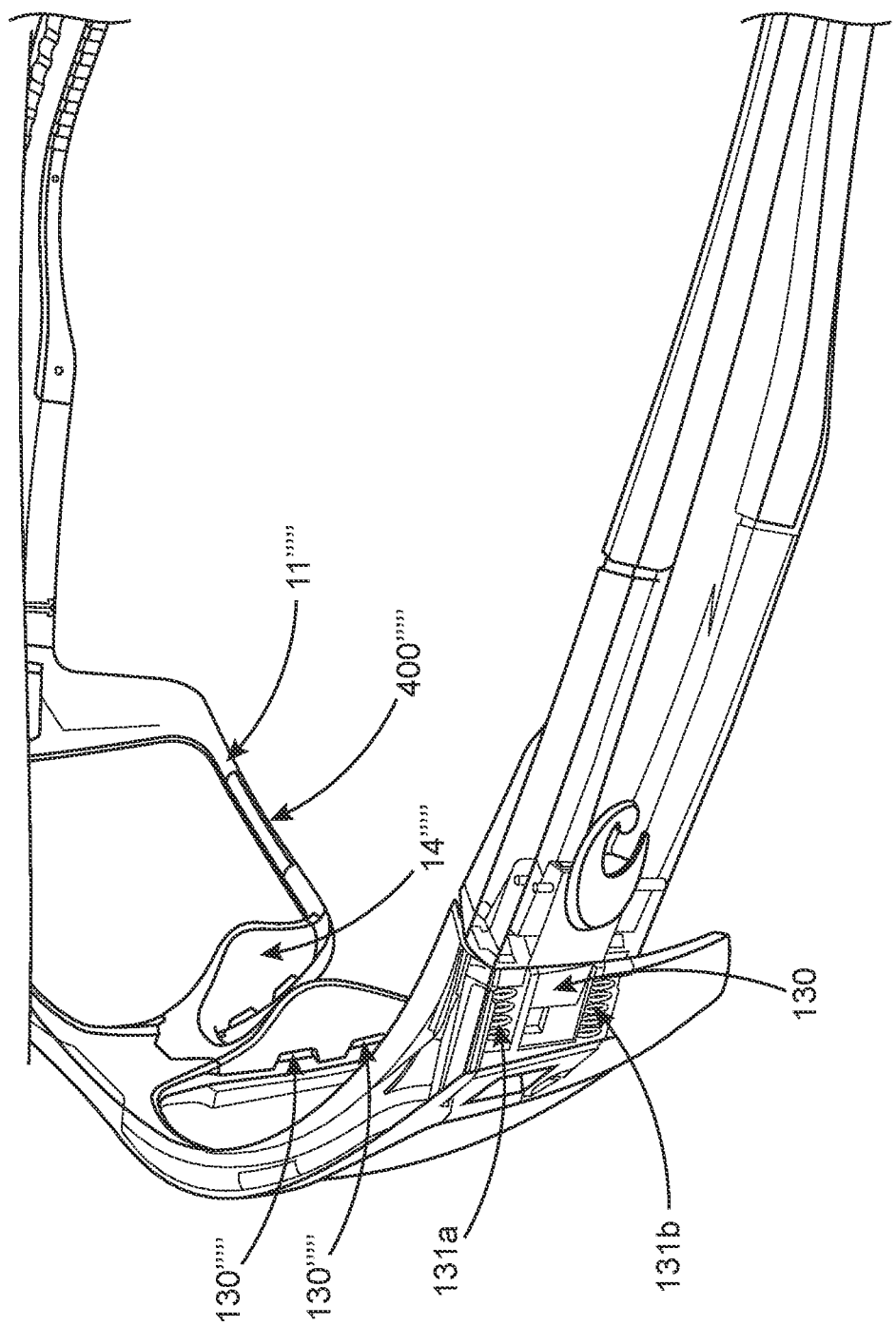
FIG. 8 is a perspective view of eyewear in accordance with another embodiment of the present invention.

In another embodiment, as depicted in FIG. 8, the at least one nose pad 13′′′′ may further comprise at least one nose rubber 14′′′′ which may contain ridges or rubber grips 500, as previously discussed in relation to FIGS. 1B and 1E. In such an embodiment, the nose pad ventilation apertures 130′′′′ may extend through both the at least one nose pad 13′′′′ and the at least one nose rubber 14′′′′, thus establishing the outer face 5′′′′ and inner face 6′′′′ in fluid communication and further providing airflow across the inner face 6′′′′ as provided above. In such an embodiment, the wearer experiences the fluid drainage and reduction in fogging, as discussed above, but with the added benefit of additional benefit of the increased mechanical grip as provided by the at least one nose rubber 14′′′′.

In further embodiments, as depicted in FIGS. 6A and 8, the front element 10′′′′ and the temple bars 20′′′′ may be affixed through a flexing mechanism 130. The flexing mechanism may comprise at least one biasing element 131*a*, 131*b*, such as a coil spring, for providing spring pressure towards the front element 10′′′′. In at least one embodiment, the flexing mechanism 130 is disposed in connection with the separable branching conduit 120, such that the separable branching conduit 120 may shuttle to and from the front element 10′′′′ as the temple bars 20′′′′ are flexed open and closed. In this manner, the separable branching conduit 120 may maintain airflow in the event the user requires temple bars 20′′′′ be flexed at various dimensions. Since many modifications, variations, and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. Eyewear comprising:
a frame including an outer face and an inner face, said frame further including a front element structured to be disposed in front of a wearer's eyes, and at least one temple bar connected to said front element;
at least one ventilation aperture disposed in said frame in fluid communication between said outer face and said inner face;
a fluid channel disposed in said temple bar;
said at least one ventilation aperture disposed in fluid communication with said fluid channel; said at least one ventilation aperture disposed and structured to direct fluid into said fluid channel; and
at least one diverter disposed in said ventilation aperture.

2. The eyewear as recited in claim 1 wherein said diverter comprises at least one inlet and at least two separate outlets.

3. The eyewear as recited in claim 2 wherein said ventilation aperture comprises a proximal side and a distal side; a space between said proximal and distal sides defining said at least one inlet of said diverter.

4. The eyewear as recited in claim 3 wherein said diverter comprises a temple bar outlet, said temple bar outlet being disposed in fluid communication with said fluid channel.

5. The eyewear as recited in claim 4 wherein said temple bar outlet contains at least two ducts in fluid communication with said fluid channel.

6. The eyewear as recited in claim 3 further comprising a separable branching conduit, said separable branching conduit disposed within said ventilation aperture, in fluid directing relation from said at least one inlet to said at least two separate outlets, said at least one inlet defined by said space between said proximal side and said distal side of said branching conduit.

7. The eyewear as recited in claim 2 wherein said diverter further comprises an inner face outlet, said inner face outlet disposed in fluid communication with said inner face.

8. The eyewear as recited in claim 1 further comprising an eye wire including an at least partially recessed portion.

9. The eyewear as recited in claim 1 further comprising a flexing mechanism connected to said front element and said at least one temple bar, said flexing mechanism comprising at least one biasing element.

10. Eyewear comprising:
a frame including an outer face and an inner face, said frame further including a front element structured to be disposed in front of a wearer's eyes, and at least one temple bar connected to said front element;
at least one ventilation aperture disposed in said frame in fluid communication with and between said outer face and said inner face;
a fluid channel disposed in said temple bar;
said at least one ventilation aperture disposed in fluid communication with said fluid channel; said at least one ventilation aperture disposed and structured to direct fluid into said fluid channel;
said frame further comprising a bridge including at least one nose pad; and
said at least one nose pad comprising at least one nose pad ventilation aperture.

11. The eyewear as recited in claim 10 further comprising at least one diverter disposed in said at least one ventilation aperture.

12. The eyewear as recited in claim 11 wherein said diverter comprises at least one inlet and at least two separate outlets, said at least two separate outlets comprising at least an inner face outlet and a temple bar outlet; wherein said inner face outlet is disposed in fluid communication with said inner face.

13. The eyewear as recited in claim 12 wherein said temple bar outlet is disposed in fluid communication with said fluid channel.

14. The eyewear as recited in claim 11 further comprising a separable branching conduit including a proximal side and a distal side, said separable branching conduit inserted into said ventilation aperture, said branching conduit directing fluid from at least one inlet to at least two separate outlets, said at least one inlet defined by a space between said proximal side and said distal side of said branching conduit; and said diverter disposed in said separable branching conduit.

15. The eyewear as recited in claim 10 wherein said nose pad ventilation aperture is disposed in fluid communication with said inner face.

16. The eyewear as recited in claim 10 wherein said nose pad comprises at least one nose rubber.

17. The eyewear as recited in claim 16 wherein said at least one nose rubber comprises a ridged surface.

18. The eyewear as recited in claim 17 wherein said nose pad ventilation aperture is disposed through said nose rubber in fluid communication between said outer face and said inner face.

19. The eyewear as recited in claim 10 wherein said at least one nose pad ventilation aperture is comprised of at least two separate apertures.

20. The eyewear as recited in claim 10 further comprising a flexing mechanism connected to said front element and said at least one temple bar, said flexing mechanism comprising at least one biasing element.

21. Eyewear comprising:
- a frame including an outer face and inner face, said frame further including a front element structured to be disposed in front of a wearer's eyes, a pair of temple bars connected to said front element;
- at least one ventilation aperture disposed in said frame in fluid communication with and between said outer face and said inner face;
- a fluid channel disposed in said temple bar;
- said at least one ventilation aperture disposed in fluid communication with said fluid channel; said at least one ventilation aperture disposed and structured to direct fluid into said fluid channel;
- at least one diverter disposed in said at least one ventilation aperture;
- said at least one diverter comprising at least one inlet and at least two outlets;
- said at least two outlets comprising a temple bar outlet in fluid communication with said fluid channel;
- said at least two outlets further comprising an inner face outlet in fluid communication with said inner face;
- said frame further comprising a bridge, said bridge comprising at least one nose pad; and
- said at least one nose pad comprising at least one nose pad ventilation aperture;
- said at least one nose pad ventilation aperture disposed in fluid communication with said inner face.

22. The eyewear as recited in claim 21 further comprising a separable branching conduit including a proximal side and a distal side, said separable branching conduit comprising at least one inlet and at least two separate outlets, said inlet extending from said proximal side to said distal side of said branching conduit; and said diverter disposed in said branching conduit.

23. The eyewear as recited in claim 21 wherein said temple bar outlet comprises at least two ducts in fluid communication with said fluid channel.

24. The eyewear as recited in claim 21 further comprising an eye wire including an at least partially recessed portion.

25. The eyewear as recited in claim 21 wherein said nose pad comprises at least one nose rubber, said nose pad ventilation aperture disposed through said at least one nose rubber.

26. The eyewear as recited in claim 25 wherein said nose rubber comprises a ridged surface.

27. The eyewear as recited in claim 21 further comprising a flexing mechanism connected to said front element and said at least one temple bar, said flexing mechanism comprising at least one biasing element.

* * * * *